United States Patent
Kim et al.

(10) Patent No.: US 10,305,097 B2
(45) Date of Patent: May 28, 2019

(54) NEGATIVE ACTIVE MATERIAL, LITHIUM BATTERY INCLUDING THE NEGATIVE ACTIVE MATERIAL, AND METHOD OF PREPARING THE NEGATIVE ACTIVE MATERIAL

(71) Applicant: SAMSUNG SDI CO., LTD., Yongin-si, Gyeonggi-do (KR)

(72) Inventors: Yeongap Kim, Yongin-si (KR); Youngugk Kim, Yongin-si (KR); Heeseon Choi, Yongin-si (KR); Jiyeon Kwak, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 319 days.

(21) Appl. No.: 15/187,722

(22) Filed: Jun. 20, 2016

(65) Prior Publication Data
US 2017/0005329 A1    Jan. 5, 2017

(30) Foreign Application Priority Data
Jul. 3, 2015    (KR) .................. 10-2015-0095357

(51) Int. Cl.
*H01M 4/36*    (2006.01)
*H01M 4/38*    (2006.01)
(Continued)

(52) U.S. Cl.
CPC ......... *H01M 4/366* (2013.01); *H01M 4/0471* (2013.01); *H01M 4/386* (2013.01);
(Continued)

(58) Field of Classification Search
CPC ...... H01M 4/366; H01M 4/386; H01M 4/624; H01M 4/625; H01M 4/0471; H01M 4/58;
(Continued)

(56) References Cited

U.S. PATENT DOCUMENTS 8,986,577 B2    3/2015    Kang et al.
2008/0160409 A1    7/2008    Ishida et al.
(Continued)

FOREIGN PATENT DOCUMENTS

JP    4747607 B2    8/2011
KR    10-0816604 B1    3/2008
(Continued)

OTHER PUBLICATIONS

EPO Extended Search Report dated Nov. 7, 2016, for corresponding European Patent Application No. 16176928.6 (7 pages).
(Continued)

*Primary Examiner* — Laura Weiner
(74) *Attorney, Agent, or Firm* — Lewis Roca Rothgerber Christie LLP

(57) ABSTRACT

Negative active materials, lithium batteries including the negative active materials, and methods of preparing the negative active materials. The negative active material includes a complex including: a silicon-based core; particles of metal nitride randomly disposed on the silicon-based core, and nanostructures disposed on at least one of the silicon-based core or the metal nitride. The negative active material may improve the electrical conductivity of a negative electrode. Accordingly, a lithium battery including the negative electrode may have improved lifetime characteristics.

10 Claims, 22 Drawing Sheets
(5 of 22 Drawing Sheet(s) Filed in Color)

(51) Int. Cl.
*H01M 4/62* (2006.01)
*H01M 10/0525* (2010.01)
*H01M 4/04* (2006.01)
*H01M 4/58* (2010.01)
*H01M 4/66* (2006.01)
*H01M 4/02* (2006.01)

(52) U.S. Cl.
CPC .............. *H01M 4/58* (2013.01); *H01M 4/624* (2013.01); *H01M 4/625* (2013.01); *H01M 4/661* (2013.01); *H01M 10/0525* (2013.01); *H01M 2004/027* (2013.01); *Y02T 10/7011* (2013.01)

(58) Field of Classification Search
CPC .............. H01M 4/661; H01M 10/0525; H01M 2004/027; Y02T 10/7011
See application file for complete search history.

(56) References Cited

U.S. PATENT DOCUMENTS

2012/0328945 A1 12/2012 Hirose et al.
2013/0004846 A1 1/2013 Kim et al.
2013/0143119 A1 6/2013 Mah et al.
2015/0147649 A1 5/2015 Jung et al.

FOREIGN PATENT DOCUMENTS

KR 10-2013-0062105 A 6/2013
KR 10-1341951 B1 12/2013

OTHER PUBLICATIONS

EPO Office Action dated Jul. 31, 2017, for corresponding European Patent Application No. 16176928.6 (5 pages).
Abstract of Japanese Patent Publication No. 2005-276821, Dated Oct. 6, 2005 Corresponding to Japanese Patent No. 4747607 B2, Dated Aug. 17, 2011, 1 Page.
Tu, J. et al., Cyclability of Si/TiN/C Composite Anode With High Rate Capability for Lithium-Ion Batteries, TMS2013 Annual Meeting Supplemental Proceedings, 2013, pp. 773-779, The Minerals, Metals & Materials Society.
EPO Summons to attend oral proceedings dated Mar. 13, 2018, for corresponding European Patent Application No. 16176928.6 (5 pages).

NEGATIVE ACTIVE MATERIAL, LITHIUM BATTERY INCLUDING THE NEGATIVE ACTIVE MATERIAL, AND METHOD OF PREPARING THE NEGATIVE ACTIVE MATERIAL

CROSS-REFERENCE TO RELATED APPLICATION

This application claims priority to and the benefit of Korean Patent Application No. 10-2015-0095357, filed on Jul. 3, 2015, in the Korean Intellectual Property Office, the entire content of which is incorporated herein by reference.

BACKGROUND

1. Field

One or more exemplary embodiments relate to negative active materials, lithium batteries including the negative active materials, and methods of preparing the negative active materials.

2. Description of the Related Art

Lithium secondary batteries utilized in electric bicycles, electric vehicles, or portable electronic devices for information and communication (such as personal digital assistants (PDAs), cellular phones, notebook computers, etc.), have discharge voltages that are two or more times the discharge voltages of existing batteries (e.g., existing batteries that are not lithium secondary batteries). As a result, the lithium secondary batteries may exhibit high energy densities.

The lithium secondary batteries produce energy by oxidation and reduction reactions when intercalation/deintercalation of lithium ions are performed in a positive electrode and a negative electrode in a state that (where) an organic electrolytic solution or a polymer electrolytic solution is charged between the positive electrode and the negative electrode, each including active materials that are capable of performing intercalation/deintercalation of lithium ions.

Information disclosed in this Background section was already known to the inventors before achieving the inventive concept or is technical information acquired in the process of achieving the inventive concept. Therefore, this Background section may contain information that does not form the prior art that is already known to the public.

SUMMARY

One aspect of an embodiment of the present disclosure is directed toward negative active materials having improved electrical conductivities and lifetime characteristics.

An aspect of an embodiment of the present disclosure is directed toward lithium batteries including the negative active materials.

An aspect of an embodiment of the present disclosure is directed toward methods of preparing the negative active materials.

Additional aspects of embodiments will be set forth in part in the description which follows and, in part, will be apparent from the description, or may be learned by practice of the presented embodiments.

According to an embodiment of the present disclosure, a negative active material includes a complex including: a silicon-based core; particles of metal nitride randomly disposed on a surface of the silicon-based core, at least a portion of the surface of the silicon-based core being free of the particles of metal nitride; and nanostructures disposed on at least one of the silicon-based core or the metal nitride.

According to one or more exemplary embodiments, the silicon-based core may include Si, $SiO_x$, a Si—Z alloy, or a combination thereof, wherein $0<x\leq2$, Z is an alkali metal, an alkali earth metal, a Group 13 element, a Group 14 element excluding Si, a Group 15 element, a Group 16 element, a transition metal, a rare earth element, or a combination thereof.

According to one or more exemplary embodiments, the metal nitride may include at least one metal selected from titanium (Ti), silicon (Si), zirconium (Zr), molybdenum (Mo), chromium (Cr), hafnium (Hf), vanadium (V), niobium (Nb), and tantalum (Ta).

According to one or more exemplary embodiments, the metal nitride may be selected from TiN, SiN, $Si_3N_4$, ZrN, $Mo_2N$, CrN, $Cr_2N$, HfN, VN, NbN, TaN, and a combination thereof.

According to one or more exemplary embodiments, the nanostructures may be in a shape of nanowire, nanofiber, nanorod, nanohair, nanofilament, and/or nanopillar.

According to one or more exemplary embodiments, the nanostructures may have a silicon-based nanostructure or a carbon-based nanostructure.

According to one or more exemplary embodiments, the nanostructures may be directly grown on the silicon-based core.

According to one or more exemplary embodiments, the negative active material may additionally include a carbon-based coating layer on the complex.

According to one or more exemplary embodiments, the silicon-based core and the metal nitride are formed by separating one compound into two phases by phase inversion.

According to an embodiment of the present disclosure, a lithium battery includes the above described negative active material.

According to an embodiment of the present disclosure, a method of preparing a negative active material for a lithium battery includes:

heat-treating a silicon-containing intermetallic compound under a nitrogen-containing gas atmosphere to prepare a silicon-based core on a surface of which particles of metal nitride are randomly formed, at least a portion of the surface of the silicon-based core being free of the particles of metal nitride; and heat-treating the silicon-based core on the surface of which the particles of metal nitride are randomly formed to prepare a complex in which nanostructures are formed on at least one of the silicon-based core or the metal nitride.

According to one or more exemplary embodiments, the heat-treating of the silicon-containing intermetallic compound may be performed at a temperature of about 1000° C. or lower.

According to one or more exemplary embodiments, the heat-treating of the silicon-based core may be performed at a temperature of about 1000° C. to about 1500° C. to directly grow silicon-based nanostructures from the silicon-based core.

According to one or more exemplary embodiments, the heat-treating of the silicon-containing intermetallic compound and the heat-treating of the silicon-based core may be performed continuously.

According to one or more exemplary embodiments, the heat-treating of the silicon-based core may be performed under a nitrogen-containing gas atmosphere.

According to one or more exemplary embodiments, the heat-treating of the silicon-based core may be performed under a carbon-containing gas atmosphere to form carbon-based nanostructures on at least one of the silicon-based core or the metal nitride.

According to one or more exemplary embodiments, the silicon-containing intermetallic compound may include a metal silicide.

According to one or more exemplary embodiments, the metal silicide may be selected from TiSi, $TiSi_2$, $Ti_5Si_4$, $Ti_3Si$, $ZrSi_2$, ZrSi, $Zr_5Si$, $Zr_5Si_4$, $Zr_5Si_3$, $MoSi_2$, $Cr_3Si$, $Cr_5Si$, $CrSi_2$, $HfSi_2$, $V_3Si$, $VSi_2$, $NbSi_2$, $TaSi_2$, $Ta_5Si_3$, $Ta_2Si$, $Ta_3Si$, and combinations thereof.

According to one or more exemplary embodiments, the silicon-containing intermetallic compound may have an average diameter of about 10 nm to about 20 μm.

According to one or more exemplary embodiments, the method of preparing the negative active material for the lithium battery may additionally include heat-treating a mixture of the prepared complex and a carbon-based precursor to prepare a complex on a surface of which a carbon-based coating layer is formed after performing the preparing of the complex.

The negative active material may improve the electrical conductivity and lifetime characteristics of a lithium battery including the negative active material by including a composite having nanostructures and a silicon-based core on the surface of which an island-type metal nitride (a metal nitride including discrete islands of the metal nitride) is disposed.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects of embodiments of the present disclosure will become apparent and more readily appreciated from the following description of the exemplary embodiments, taken in conjunction with the accompanying drawings in which.

DETAILED DESCRIPTION

Figure 1A:
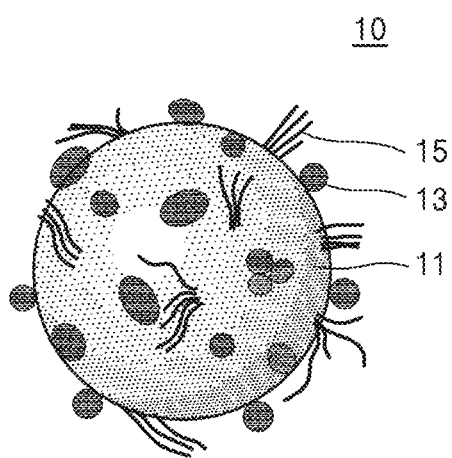
FIG. 1A is a schematic diagram showing the structure of a complex according to one or more exemplary embodiments.

Reference will now be made in more detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of embodiments of the present description. As used herein, the term "and/or" includes any and all combinations of one or more of the associated listed items. Expressions such as "at least one of" when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration. As used herein, the terms "combination thereof" and "combinations thereof" may refer to a chemical combination (e.g., an alloy or chemical compound), a mixture, or a laminated structure of components.

As used herein, the terms "substantially," "about," and similar terms are used as terms of approximation and not as terms of degree, and are intended to account for the inherent deviations in measured or calculated values that would be recognized by those of ordinary skill in the art. Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Hereinafter, the present disclosure is described in more detail.

Generally, examples of negative active materials of lithium secondary batteries may include a various carbonaceous materials (including artificial graphite, natural graphite, and hard carbon) and non-carbonaceous materials (such as silicon (Si)) that are capable of performing intercalation/deintercalation of lithium.

The capacity density of the non-carbonaceous materials is 10 or more times the capacity density of graphite. On the other hand, capacity retention rates, charge/discharge efficiencies, and lifetime characteristics of lithium secondary batteries including the non-carbonaceous materials may be dropped because electrical conductivities of the non-carbonaceous materials are not good, and the non-carbonaceous materials have large volume changes during charging and discharging of lithium. Therefore, it is required to develop high performance negative active materials having improved electrical conductivities and lifetime characteristics.

A negative active material according to an embodiment of the present disclosure includes a complex including:

a silicon-based core;

an island-type metal nitride (a metal nitride including discrete islands of the metal nitride) randomly disposed on the silicon-based core (e.g., particles or patches of metal nitride randomly disposed on a surface of the silicon-based core, at least a portion of the surface of the silicon-based core being free (e.g., substantially or completely free) of the particles or patches of metal nitride); and nanostructures disposed on at least one of the silicon-based core or the metal nitride.

Figure 1B:
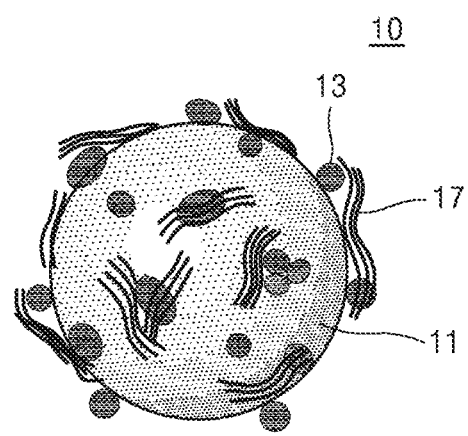
FIG. 1B is a schematic diagram showing the structure of a complex according to other exemplary embodiments.

The structures of a complex according to one or more exemplary embodiments are mimetically (e.g., schematically) illustrated in FIGS. 1A and 1B. Referring to FIG. 1A, a complex 10 has a structure in which an island-type metal nitride 13 (a metal nitride including discrete islands of the metal nitride) is randomly disposed on the surface of a silicon-based core 11 (e.g., particles or patches of metal nitride 13 are randomly disposed on the surface of the silicon-based core 11, where the particles or patches of the metal nitride are not all connected to one another to completely cover the whole surface of the silicon-based core, and at least a portion of the surface of the silicon-based core is free (e.g., substantially or completely free) of the particles or patches of the metal nitride), and nanostructures 15 are disposed on the surface of the silicon-based core 11. Further, Referring to FIG. 1B, the complex 10 has a structure in which an island-type metal nitride 13 (a metal nitride including discrete islands of the metal nitride) is randomly disposed on the surface of the silicon-based core 11, and nanostructures 17 are disposed on the surface of the silicon-based core 11 and/or the metal nitride 13.

Although only silicon-based cores 11 shaped as spheres are illustrated in FIGS. 1A and 1B, the silicon-based core is not necessarily limited to the silicon-based cores 11 having spherical shapes. Examples of the silicon-based core may include spherical silicon-based cores with at least a portion of it having curved or bent external appearances; oval or polygonal silicon-based core; and silicon-based core having protrusions and depressions formed on its surface.

The "silicon-based" core refers to a silicon-based core that includes at least about 50% by weight of silicon (Si).

For example, the silicon-based core may include at least about 60% by weight, about 70% by weight, about 80% by weight, about 90% by weight of silicon, or about 100% by weight of silicon. The negative active material may realize high-capacity batteries by including the silicon-based core, compared to carbon-based negative active material.

For example, the silicon-based core 11 may include Si, $SiO_x$ ($0<x\leq2$), a Si—Z alloy (wherein Z is an alkali metal, an alkali earth metal, a Group 13 element, a Group 14 element excluding Si, a Group 15 element, a Group 16 element, a transition metal, a rare earth element, or a combination thereof), and a combination thereof. The element Z may be selected from Mg, Ca, Sr, Ba, Ra, Sc, Y, La, Ti, Zr, Hf, V, Nb, Ta, Cr, Mo, W, Tc, Re, Fe, Ru, Os, Co, Rh, Ir, Ni, Pd, Pt, Cu, Ag, Au, Zn, Cd, B, Ge, P, As, Sb, Bi, S, Se, Te, Po, and combinations thereof. Further, silicon-based materials (such as Si, SiOx, Si—Z alloy etc.) may include: an amorphous silicon; a crystalline silicon (such as a single crystalline silicon or a polycrystalline silicon); and mixed forms thereof. For example, the silicon-based core may be silicon (Si) from the aspect of high capacity (e.g., in order to achieve high capacity).

An average particle diameter of the silicon-based core 11 is not particularly limited. However, if the average particle diameter of the silicon-based core 11 is excessively small, cycle characteristics may deteriorate because the silicon-based core 11 may have a high reactivity with an electrolytic solution. Further, if the average particle diameter of the silicon-based core 11 is excessively large, dispersibility may be dropped (e.g., reduced), and the surface of the negative electrode may be roughened when forming a negative active material composition.

According to one or more exemplary embodiments, the silicon-based core 11 may have an average particle diameter of about 0.01 μm to about 30 μm. For example, the silicon-based core 11 may have an average particle diameter of about 0.05 μm to about 3 μm. As an example, the silicon-based core 11 may have an average particle diameter of about 0.05 μm to about 1 μm.

An average particle diameter in the present disclosure may refer to a D50 value, wherein the "D50 value" refers to the particle diameter value corresponding to 50% on a cumulative distribution curve in which powder particle sizes are cumulated in the order from the smallest powder particle to the largest powder particle and the total powder particle number is 100%. The D50 value may be measured by using any suitable method generally available in the art. For example, the D50 value may be measured by a particle size analyzer, or may also be measured from TEM photographs or SEM photographs. For example, after measuring the D50 value with a measuring device utilizing dynamic light scattering (as a suitable method) and performing the data analysis process to count numbers of powder particles with respect to respective powder particle size ranges, the D50 value may be easily obtained through the calculation from the counted numbers of powder particles.

The metal nitride 13 as an island-type metal nitride (a metal nitride including discrete islands of the metal nitride) is randomly disposed on the silicon-based core 11. Herein, the term "island" type refers to (particles having) a spherical, semi-spherical, non-spherical, or atypical shape having a set or predetermined volume, and the "island" type is not limited to any particular shapes. As shown in FIG. 1A, the island-type metal nitride 13 may include spherical particles that are randomly disposed on the silicon-based core 11, or that are disposed on the silicon-based core 11 in the form of an irregular cluster in which several particles are united (e.g., agglomerated). Further, because not all particles of the metal nitride 13 are connected to one another, the metal nitride 13 may not completely cover the silicon-based core 11 (e.g., at least a portion of the surface of the silicon-based core is exposed and free (e.g., substantially or completely free) of the particles of metal nitride).

The metal nitride 13 may not perform intercalation/deintercalation of lithium ions during charging and discharging of a lithium battery. Therefore, because structural changes do not occur in the metal nitride 13 during charging and discharging of a lithium battery, volume expansions of the silicon-based core 11 may be suppressed. Further, because the metal nitride 13 is randomly disposed (e.g., the particles of the metal nitride 13 are randomly disposed) on the silicon-based core 11 such that intercalation/deintercalation of lithium ions of the silicon-based core 11 may not be interrupted, a lithium battery having a high capacity and relieved (e.g., suppressed) volume expansions may be realized.

Further, the metal nitride 13 may have poor (e.g., low) reactivity also with an electrolytic solution because the metal nitride 13 has poor reactivity with lithium ions. Therefore, the silicon-based core 11, on which the metal nitride 13 is disposed, may have a reduced side reaction with the electrolytic solution compared to the silicon-based core 11, on which the metal nitride 13 is not disposed. Accordingly, a lithium battery having improved lifetime characteristics may be realized.

Moreover, the metal nitride 13 may have a high electrical conductivity. The metal nitride 13 may have an electrical conductivity of about $2\times10^4$ $\Omega^{-2}$ $cm^{-1}$ to about $5\times10^4$ $\Omega^{-2}$ $cm^{-1}$. On the contrary, the silicon-based core 11 may have an electrical conductivity of about $1\times10^{-3}$ $\Omega^{-2}$ $cm^{-1}$ to about $2\times10^{-3}$ $\Omega^{-2}$ $cm^{-1}$. Therefore, the metal nitride 13 supplements the low electrical conductivity of the silicon-based core 11 to improve the conductivity of electrons between the negative active material particles or between a negative active material and a metal current collector.

According to one or more exemplary embodiments, examples of the metal nitride 13 may include at least one metal selected from titanium (Ti), silicon (Si), zirconium (Zr), molybdenum (Mo), chromium (Cr), hafnium (Hf), vanadium (V), niobium (Nb), and tantalum (Ta), but the metal nitride 13 is not limited to these examples. For example, the metal nitride 13 may include a nitride of titanium or zirconium having a low reactivity with silicon while the metal is easily formed into a nitride. For example, the metal nitride 13 may include a nitride of titanium. For example, the metal nitride 13 may be a nitride of titanium.

According to one or more exemplary embodiments, the metal nitride 13 may include TiN, SiN, $Si_3N_4$, ZrN, $Mo_2N$, CrN, $Cr_2N$, HfN, VN, NbN, TaN, or a combination thereof, but the metal nitride 13 is not limited thereto. For example, the metal nitride 13 may include TiN or ZrN. For example, the metal nitride 13 may be TiN or ZrN.

The average particle diameter of the metal nitride 13 (e.g., of the metal nitride particles) is not particularly limited. However, the metal nitride 13 may have an average particle diameter of about 1 nm to about 1 μm, e.g., about 1 nm to about 500 nm. As an example, the metal nitride 13 may have an average particle diameter of about 1 nm to about 100 nm. The metal nitride 13 having an average particle diameter in the above-mentioned ranges may improve the electrical conductivities of negative electrodes, may suppress the volume expansions, and may not disrupt the intercalation/deintercalation of lithium ions of the silicon-based core 11.

The silicon-based core 11 and the metal nitride 13 may be separated into two phases from one compound by phase inversion. For example, the silicon-based core 11 and the metal nitride 13 may be formed by precipitating the metal nitride 13 on the surface of the silicon-based core 11 by phase separation of a compound having both silicon and the metal of the metal nitride under suitable conditions.

The nanostructures 15 and 17 may be disposed on the silicon-based core 11 (referring to FIG. 1A), or may be disposed on the silicon-based core 11 and the metal nitride 13 (referring to FIG. 1B). Here, "nanostructures" are structures having a sectional diameter (e.g., a cross-sectional diameter) in a nanometer unit (e.g., in a nanometer range, e.g., a sectional diameter (e.g., a cross-sectional diameter) of less than 1000 nm). In one embodiment, the nanostructures may have a sectional diameter (e.g., a cross-sectional diameter) of about 10 nm to about 100 nm, a length of about 10 nm to about 10 μm, and an aspect ratio (length/width) of about 50 or higher, for example, about 100 or higher, or about 200 or higher. The nanostructures 15 and 17 are placed on a portion of the surface of the silicon-based core 11 and/or the metal nitride 13 such that the nanostructures 15 and 17 may have capabilities that can absorb volume changes related to the charging and discharging of a lithium battery.

According to one or more exemplary embodiments, the nanostructures 15 and 17 may be in the shape of nanowire, nanofiber, nanorod, nanohair, nanofilament, and/or nanopillar, but the nanostructures 15 and 17 are not limited thereto. The nanostructures 15 and 17 may be formed in any suitable form if the nanostructures 15 and 17 have an aspect ratio of about 50 or higher, and a sectional diameter (e.g., a cross-sectional diameter) in a nanometer unit. On the other hand, diameters of the nanostructures may be substantially uniform or variable (e.g., non-uniform), and at least portions of the long axes of the nanostructures may be a straight line, or be curved, bent, or branched.

Examples of a method of disposing the nanostructures 15 and 17 on the silicon-based core 11 may include a method of directly growing silicon-based nanostructures on the silicon-based core 11, and a method of disposing the grown silicon-based nanostructures on the silicon-based core 11, e.g., adhering or bonding the grown silicon-based nanostructures to the silicon-based core 11 after growing the silicon-based nanostructures separately from the silicon-based core 11. The method of disposing the nanostructures 15 and 17 on the silicon-based core 11 may include any suitable method, and is not particularly limited. Examples of the method of disposing the nanostructures 15 and 17 on the silicon-based core 11 may include a method of growing the nanostructures utilizing a vapor-liquid-solid (VLS) growing process, and a method of preparing the nanostructures 15 and 17 utilizing a nanosized catalyst to decompose a precursor gas near the catalyst. However, the method of disposing the nanostructures 15 and 17 on the silicon-based core 11 is not limited thereto.

According to one or more exemplary embodiments, the nanostructures 15 may include silicon-based nanostructures 15. For example, the nanostructures 15 may be silicon-based nanostructures 15.

The meaning of the term "silicon-based" in the silicon-based nanostructures 15 may be the same as that of "silicon-based" in the silicon-based core.

For example, the silicon-based nanostructures 15 may include Si, $SiO_x$ (0<x<2), a Si—Z alloy (wherein Z is an alkali metal, an alkali earth metal, a Group 13 element, a Group 14 element excluding Si, a Group 15 element, a Group 16 element, a transition metal, a rare earth element, or a combination thereof), or a combination thereof. The element Z may be selected from Mg, Ca, Sr, Ba, Ra, Sc, Y, La, Ti, Zr, Hf, V, Nb, Ta, Cr, Mo, W, Tc, Re, Fe, Ru, Os, Co, Rh, Ir, Ni, Pd, Pt, Cu, Ag, Au, Zn, Cd, B, Ge, P, As, Sb, Bi, S, Se, Te, Po, and a combination thereof. Further, silicon-based materials, such as Si, SiOx, Si—Z alloy etc., may include: an amorphous silicon; a crystalline silicon (such as a single crystalline silicon or a polycrystalline silicon); and mixed forms thereof. For example, the silicon-based nanostructures may be silicon (Si) from the aspect of high capacity (e.g., in order to achieve high capacity).

For example, the silicon-based nanostructures 15 may be nanostructures directly grown on the silicon-based core 11 such as the nanostructures 15 of FIG. 1A. For example, the silicon-based nanostructures may have the same components as the silicon-based core 11. For example, the silicon-based nanostructures 15 may be grown on the silicon-based core 11 after forming the silicon-based core 11 and the metal nitride 13 by phase separation of a compound having both silicon and the metal. Therefore, the silicon-based nanostructures 15 may not be disposed on the metal nitride 13, but may be disposed on the silicon-based core 11 only.

For example, the silicon-based nanostructures 15 may have a sectional diameter (e.g., a cross-sectional diameter) of about 10 nm to about 50 nm. For example, the silicon-based nanostructures 15 may have a length of about 500 nm to about 10 μm. As an example, the silicon-based nanostructures 15 may have a length of about 1 μm to about 5 μm.

According to other exemplary embodiments, the nanostructures 17 may include carbon-based nanostructures 17. If the nanostructures 17 include carbon-based nanostructures 17, the electrical conductivity of a negative electrode may be further increased. For example, the nanostructures 17 may be carbon-based nanostructures 17.

The "carbon-based" in the carbon-based nanostructures 17 refers to the carbon-based nanostructures 17 that include at least about 50% by weight of carbon based on the total weight of the carbon-based nanostructure. For example, the carbon-based nanostructures 17 include at least about 60% by weight, 70% by weight, 80% by weight, 90% by weight, or 100% by weight of carbon.

For example, the carbon-based nanostructures 17 may include amorphous carbon. Here, "amorphous" refers to a structure in which micro-crystallites of the carbon atom are disorderly intertwined to one another because the size of a carbon hexagonal plane consisting of carbon atoms is small, and epitaxial growth in the c axis direction has not been developed.

For example, the carbon-based nanostructures 17 may be nanostructures grown by a separate carbon supply source on the silicon-based core 11 and/or the metal nitride 13 (such as nanostructures 15 of FIG. 1B). For example, the carbon-based nanostructures 17 may be grown by the addition of a carbon-containing gas after the silicon-based core 11 and the metal nitride 13 are formed. In some embodiments, the carbon-based nanostructures 17 may be formed by spinning a polymer material that is capable of providing carbon by carbonization. Examples of the usable polymer material may include polyacrylic acid, polyurethane, polyvinyl alcohol (PVA), polyvinyl pyrrolidone (PVP), polyethylene oxide (PEO), polyvinylidene fluoride (PVDF), polymethyl methacrylate (PMMA), polyacrylonitrile (PAN), etc., but the polymer material is not limited to these examples. The polymer material may be dissolved into an appropriate solvent before spinning the polymer material.

For example, the carbon-based nanostructures 17 may have a sectional diameter (e.g., a cross-sectional diameter) of about 10 nm to about 50 nm. For example, the carbon-based nanostructures 17 may have a length of about 10 nm to about 1 μm, or, the carbon-based nanostructures 17 may have a length of about 10 nm to about 300 nm.

As described above, the metal nitride and the nanostructures may have the effects of suppressing the volume expansions of the silicon-based core and improving the electrical conductivity of a complex of the silicon-based core/metal nitride/nanostructures, compared to a complex of only the silicon-based core/metal nitride or a complex of only the silicon-based core/nanostructures. With this, a lithium battery having a high capacity and excellent lifetime characteristics may be realized.

According to one or more exemplary embodiments, the complex of the silicon-based core/metal nitride/nanostructures may be primary particles. Therefore, the negative active material may include the primary particles and/or secondary particles in which the primary particles are aggregated.

According to one or more exemplary embodiments, the negative active material 100 may additionally include a carbon-based coating layer 30 disposed on the complex. The structures of the negative active material 100 are accordingly shown in FIGS. 2A and 2B. Meaning of the term "carbon-based" in the carbon-based coating layer is the same as that described above.

Figure 2A:
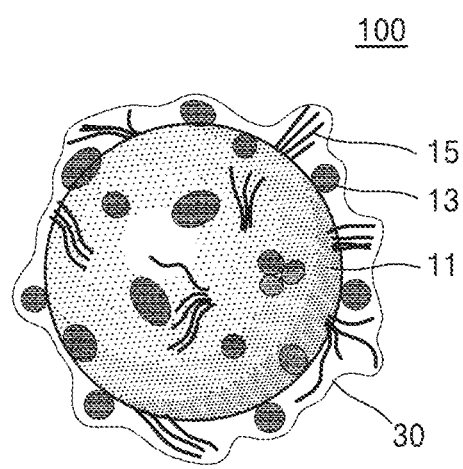
FIG. 2A is a schematic diagram showing the structure of a negative active material according to one or more exemplary embodiments.
Figure 2B:
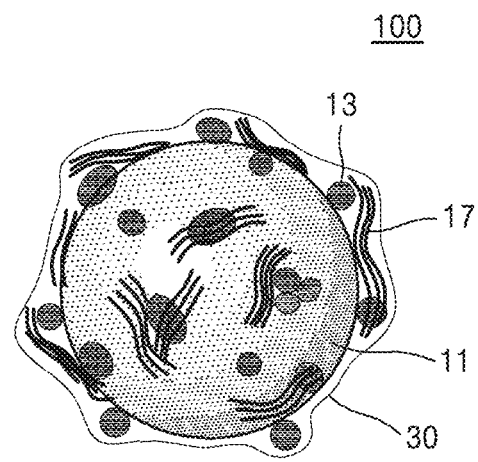
FIG. 2B is a schematic diagram showing the structure of a negative active material according to other exemplary embodiments.

Referring to FIGS. 2A and 2B, the carbon-based coating layer 30 may be a continuous coating layer formed on the surface of the complex according to FIGS. 1A and 1B. The term "continuous coating layer" refers to coating layers formed in such a form that the core is completely coated to cover the core entirely. In some embodiments, the coating layer may be a discontinuous island-type coating layer (a coating layer including discrete islands of the coating layer). Here, meaning of the term "island" type is the same as described above. The carbon-based coating layer 30 is integrated with the core to further suppress a side reaction with an electrolytic solution, volume expansion of the silicon-based core 11, etc.

For example, the carbon-based coating layer may include amorphous carbon. For example, the carbon-based coating layer may include at least about 60% by weight, 70% by weight, 80% by weight, or 90% by weight, or consist of 100% by weight of amorphous carbon based on the total weight of the carbon-based coating layer.

According to one or more exemplary embodiments, the complex and the carbon-based coating layer may contain about 0.1% by weight to about 30% by weight of carbon based on the total weight of the complex and the carbon-based coating layer.

According to one or more exemplary embodiments, the complex and the carbon-based coating layer may contain about 20% by weight to about 55% by weight of silicon based on the total weight of the complex and the carbon-based coating layer.

The negative active material may additionally include a carbon material.

The carbon material may be crystalline carbon, amorphous carbon, or a mixture thereof.

Examples of the crystalline carbon may include graphites such as atypical (e.g., irregularly shaped), plate-shaped, flake-shaped, spherical or fibrous natural and/or artificial graphites. Examples of the atypical carbon may include soft carbon or hard carbon, mesophased pitch carbides, calcined cokes, etc.

For example, the negative active material may contain about 5% by weight to about 40% by weight of the carbon material based on the total weight of the negative active material.

According to other embodiments of the present disclosure, a method of preparing the negative active material includes: primarily (e.g., first) heat-treating a silicon-containing intermetallic compound under a nitrogen-containing gas atmosphere to prepare a silicon-based core on the surface of which an island-type metal nitride (a metal nitride including discrete islands of the metal nitride) is randomly formed (e.g., particles or patches of metal nitride are randomly disposed on a surface of the silicon-based core, at least a portion of the surface of the silicon-based core being free (e.g., substantially or completely free) of the particles or patches of the metal nitride); and secondly (e.g., subsequently) heat-treating the silicon-based core on the surface of which an island-type metal nitride (a metal nitride including discrete islands of the metal nitride) is randomly formed to prepare a complex in which nanostructures are formed on at least one of the silicon-based core or the metal nitride.

Figure 3:
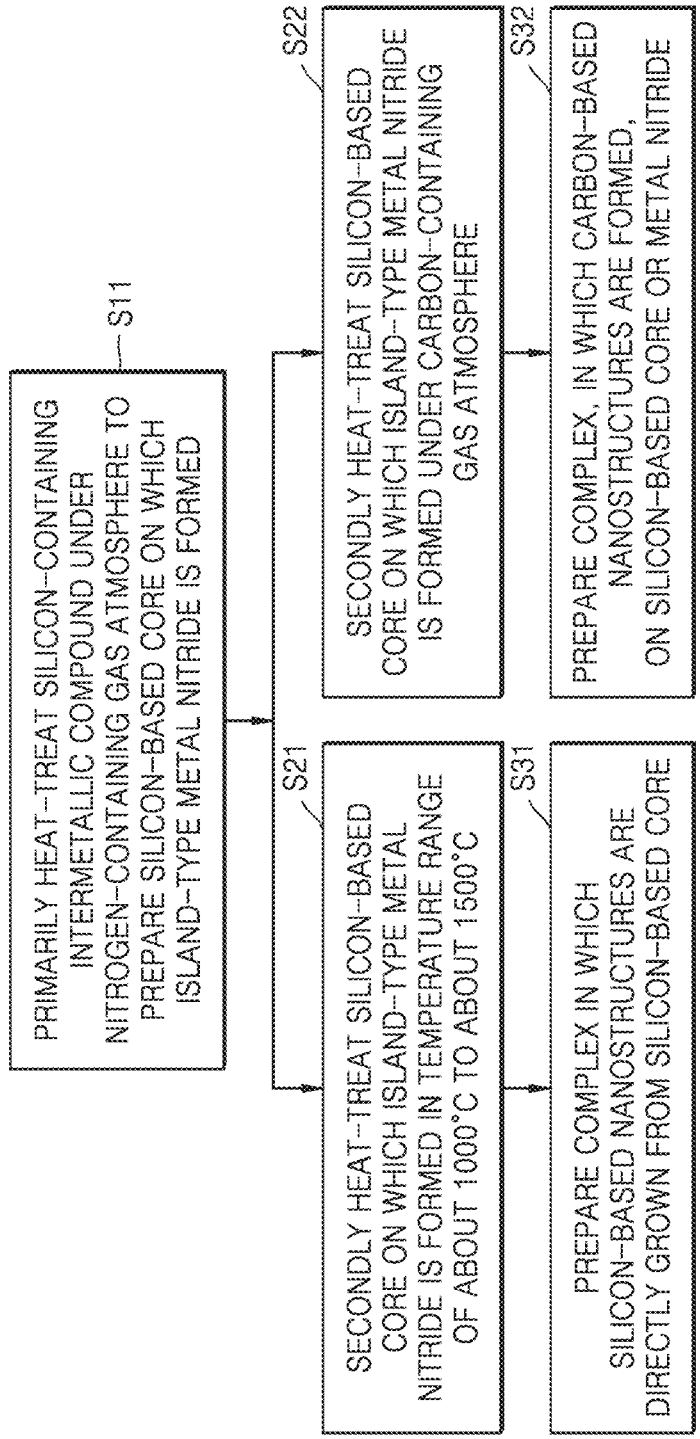
FIG. 3 is a flow chart showing a method of preparing a negative active material according to one or more exemplary embodiments.

A flow chart for the method of preparing the negative active material is shown in FIG. 3.

First, metal in the intermetallic compound is reacted with nitrogen to form a compound such that the compound is produced while silicon is separately precipitated by performing the primarily (e.g., first) heat-treating of the silicon-containing intermetallic compound under the nitrogen-containing gas atmosphere (S11). For example, phase separation occurs in the heat treatment step (S11) such that metal nitride may be randomly formed on the surface of the silicon-based core. After the heat treatment step, some of the silicon-containing intermetallic compound of which the phase separation does not occur may remain.

According to one or more exemplary embodiments, the first heat treatment may be performed at a temperature of about 1000° C. or lower. For example, the first heat treatment may be performed at a temperature of about 800° C. to about 1000° C. for about 0.5 hour to about 10 hours. In the temperature ranges disclosed above, phase separation of the silicon-based core and the metal nitride from the silicon-containing intermetallic compound may occur effectively.

According to one or more exemplary embodiments, the silicon-containing intermetallic compound may include a metal silicide.

Examples of the metal silicide may include TiSi, TiSi$_2$, Ti$_5$Si$_4$, Ti$_3$Si, ZrSi$_2$, ZrSi, Zr$_5$Si, Zr$_5$Si$_4$, Zr$_5$Si$_3$, MoSi$_2$, Cr$_3$Si, Cr$_5$Si, CrSi$_2$, HfSi$_2$, V$_3$Si, VSi$_2$, NbSi$_2$, TaSi$_2$, Ta$_5$Si$_3$, Ta$_2$Si, Ta$_3$Si, and a combination thereof. The metal in the metal silicide may be easily bonded to nitrogen when heat-treating the metal silicide in a nitrogen-containing gas atmosphere, because the metal in the metal silicide has a low reactivity with silicon. For example, the metal silicide may include TiSi$_2$ or ZrSi$_2$.

$$2TiSi_2 + N_2 \rightarrow 4Si + 2TiN \ (\Delta G \sim -90 \ kJ) \quad \text{Reaction Formula 1}$$

As shown in the Reaction Formula 1, because a reaction between metal silicide and nitrogen corresponds to a thermodynamically stable reaction, the reaction between metal silicide and nitrogen may easily occur without a separate catalyst.

According to one or more exemplary embodiments, the silicon-containing intermetallic compound may have an average particle diameter of about 10 nm to about 20 μm, e.g., about 10 nm to about 1 μm. For example, the silicon-containing intermetallic compound may have an average particle diameter of about 10 nm to about 500 nm. In the above disclosed ranges, efficiencies of producing silicon and a nitride may be high, and no nitride may exist in the silicon-based core, but a nitride may exist on the surface of the silicon-based core.

The nitrogen-containing gas may include nitrogen gas, ammonia gas, or a mixture thereof. The nitrogen-containing gas may be mixed with an inert gas such that a mixture of the nitrogen-containing gas and the inert gas may be utilized.

Next, the silicon-based core on the surface of which an island-type metal nitride (a metal nitride including discrete islands of the metal nitride) is randomly formed is secondly (e.g., subsequently) heat-treated.

The secondly (e.g., subsequently) heat-treating may be performed by one or more of two methods.

According to one or more exemplary embodiments, the secondary heat treatment may be performed at a higher temperature than the primary heat treatment. For example, the second heat treatment is performed at a temperature of about 1000° C. to about 1500° C. (S21) such that a complex in which silicon-based nanostructures are directly grown from the silicon-based core may be prepared (S31).

For example, the secondary heat treatment may be performed continuously after performing the primary heat treatment. As an example, the secondary heat treatment may be performed under a nitrogen-containing gas atmosphere while increasing a temperature of the primary heat treatment without adding a separate raw material.

According to other exemplary embodiments, the secondary heat treatment may be performed in a carbon-containing gas atmosphere (S22). For example, the secondary heat treatment may be performed by supplying a carbon-containing gas in a state that the nitrogen-containing gas utilized in the primary heat treatment is stopped. Carbon-based nanostructures may be formed on at least one of the silicon-based core or the metal nitride by the secondary heat treatment (S32).

For example, the carbon-containing gas may include a methane gas, an acetylene gas, a toluene gas, and mixtures thereof. The carbon-containing gas may be mixed with an inert gas such that a mixture of the carbon-containing gas and the inert gas may be utilized.

Next, the second heat treatment may additionally include, after performing the preparing of the complex, heat-treating a mixture of the complex and a carbon-based precursor to prepare a complex on the surface of which a carbon-based coating layer is formed.

Examples of the carbon-based precursor may include polyacrylonitrile, polyfurfuryl alcohol, cellulose, glucose, polyvinyl chloride, polyacrylic acid, polylactic acid, polyethylene oxide, polypyrrole, polyimide, polyamide, polyamide imide, polyaramid, polybenzyl imidazole, polyaniline, phenolic resin, pitches, and combinations thereof. Examples of the carbon-based precursor may be pitches. The heat treatment may be performed at a temperature of about 200° C. to about 1000° C. for about 0.5 hour to about 5 hours to prepare a complex on the surface of which an amorphous carbon-based coating layer is formed.

According to an embodiment of the present disclosure, a lithium battery includes a negative electrode including the above-described negative active material. For example, a lithium battery according to one or more exemplary embodiments may include: a negative electrode including the negative active material; a positive electrode disposed oppositely to the negative electrode; and an electrolyte disposed between the negative electrode and the positive electrode.

The negative electrode and the lithium battery including the same may be prepared by the following methods.

The negative electrode includes the above-described negative active material. For example, the negative electrode may be prepared by a method of mixing the negative active material, a binder and selectively (e.g., optionally) a conducting agent with a solvent to prepare a negative active material composition; and then molding the negative active material composition into a set or predetermined form, or coating the negative active material composition on a current collector such as a copper foil, etc.

The binder utilized in the negative active material composition, as a component which assists in bonding the negative active material to the conducting agent, etc., and in bonding the negative active material to the current collector, is added in an amount of about 1 weight part to about 50 weight parts based on 100 weight parts of the negative active material. For example, the binder may be added in an amount of about 1 weight part to about 30 weight parts, about 1 weight part to about 20 weight parts, or about 1 weight part to about 15 weight parts based on 100 weight parts of the negative active material. Examples of the binder may include polyvinylidene fluoride, polyvinylidene chloride, polybenzimidazole, polyimide, polyvinyl acetate, polyacrylonitrile, polyvinyl alcohol, carboxy methyl cellulose (CMC), starch, hydroxypropyl cellulose, regenerated cellulose, polyvinyl pyrrolidone, tetrafluoroethylene, polyethylene, polypropylene, polystyrene, polymethyl methacrylate, polyaniline, acrylonitrile butadiene styrene, phenolic resin, epoxy resin, polyethylene terephthalate, polytetrafluoroethylene, polyphenylene sulfide, polyamideimide, polyetherimide, polyether sulfone, polyamide, polyacetal, polyphenylene oxide, polybutylene terephthalate, ethylene-propylene-diene terpolymer (EPDM), sulfonated EPDM, styrene butadiene rubber, fluorine rubber, various suitable copolymers, etc.

Additionally, the negative electrode may selectively (e.g., optionally) include a conducting agent to further improve the electrical conductivity by providing a conducting path to the negative active material. In general, any suitable materials for the conducting agent generally utilized in a lithium battery may be utilized as the conducting agent. Examples of the conducting agent may include conductive materials including: carbonaceous materials (such as carbon black, acetylene black, Ketjen black, carbon fibers (e.g., vapor phase grown carbon fibers), etc.); metal based materials including metal powders and metal fibers (such as copper, nickel, aluminum, silver, etc.); conductive polymers (such as polyphenylene derivatives); and mixtures thereof. The amount of the conducting agent contained in the negative active material may be appropriately adjusted before the negative active material containing the conducting agent is utilized. For example, the negative active material and the conducting agent may be added in a weight ratio of about 99:1 to about 90:10.

Examples of the solvent may include N-methylpyrrolidone (NMP), acetone, water, etc. The solvent may be contained in an amount of about 1 weight part to about 10 weight parts based on 100 weight parts of the negative active material.

Further, the current collector is generally made to a thickness of about 3 μm to about 500 μm. The materials for the current collector are not particularly limited if the current collector includes materials which do not cause chemical changes in relevant batteries, but have suitable electrical conductivities. Examples of the current collector may include: copper; stainless steel; aluminum; nickel; titanium; calcined carbon; copper or stainless steel of which the surface is treated with carbon, nickel, titanium, silver, etc.; aluminum-cadmium alloys; etc. Further, micro protrusions and depressions may be formed on the surface of the current collector such that binding power of the negative active material may be strengthened, and the current collector may be utilized in various suitable forms such as a film, a sheet, a foil, a net, a porous body, a foam, a nonwoven fabric, etc.

A negative electrode plate may be prepared by directly coating the prepared negative active material composition on the current collector. The negative electrode plate may, in some embodiments, be obtained by casting the negative active material composition on a separate support; delaminate a negative active material film from the support; and laminating the negative active material film on a copper foil current collector. The negative electrode is not limited to the above-listed forms, but may include other suitable forms.

The negative active material composition may be utilized not only in the preparation of an electrode of a lithium battery, but also in the manufacturing of a printable battery in a state that the negative active material composition is printed on a flexible electrode substrate.

Separately from this, a positive active material composition in which a positive active material, a conducting agent, a binder, and a solvent are mixed is prepared in order to manufacture a positive electrode.

Any suitable materials may be utilized if these materials are ordinarily utilized as the positive electrode material in the art. Examples of each of a first positive active material core and a second positive active material core may independently include the following compounds represented by any formula selected from: $Li_aAl_{1-b}L_bD_2$ (wherein, $0.90 \leq a \leq 1$ and $0 \leq b \leq 0.5$); $Li_aE_{1-b}L_bO_{2-c}D_c$ (wherein, $0.90 \leq a \leq 1$, $0 \leq b \leq 0.5$, and $0 \leq c \leq 0.05$); $LiE_{2-b}L_bO_{4-c}D_c$ (wherein, $0 \leq b \leq 0.5$ and $0 \leq c \leq 0.05$); $Li_aNi_{1-b-c}Co_bL_cD_c$, (wherein, $0.90 \leq a \leq 1$, $0 \leq b \leq 0.5$, $0 \leq c \leq 0.05$, and $0 < \alpha \leq 2$); $Li_aNi_{1-b-c}Co_bL_cO_{2-\alpha}M_\alpha$ (wherein, $0.90 \leq a \leq 1$, $0 \leq b \leq 0.5$, $0 \leq c \leq 0.05$, and $0 < \alpha < 2$); $Li_aNi_{1-b-c}Co_bL_cO_{2-\alpha}M_2$ (wherein, $0.90 \leq a \leq 1$, $0 \leq b \leq 0.5$, $0 \leq c \leq 0.05$, and $0 < \alpha < 2$); $Li_aNi_{1-b-c}Mn_bL_cD_\alpha$ (wherein, $0.90 \leq a \leq 1$, $0 \leq b \leq 0.5$, $0 \leq c \leq 0.05$, and $0 < \alpha \leq 2$); $Li_aNi_{1-b-c}Mn_bL_cO_{2-\alpha}M_\alpha$ (wherein, $0.90 \leq a \leq 1$, $0 \leq b \leq 0.5$, $0 \leq c \leq 0.05$, and $0 < \alpha < 2$); $Li_aNi_{1-b-c}Mn_bL_cO_{2-\alpha}M_2$ (wherein, $0.90 \leq a \leq 1$, $0 \leq b \leq 0.5$, $0 \leq c \leq 0.05$, and $0 < \alpha < 2$); $Li_aNi_bE_cG_dO_2$ (wherein, $0.90 \leq a \leq 1$, $0 \leq b \leq 0.9$, $0 \leq c \leq 0.5$, and $0.001 \leq d \leq 0.1$); $Li_aNi_bCo_cMn_dG_eO_2$ (wherein, $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein, $0.90 \leq a \leq 1$ and $0.001 \leq b \leq 0.1$); $Li_aCoG_bO_2$ (wherein, $0.90 \leq a \leq 1$ and $0.001 \leq b \leq 0.1$); $Li_aMnG_bO_2$ (wherein, $0.90 \leq a \leq 1$ and $0.001 \leq b \leq 0.1$); $Li_aMn_2G_bO_4$ (wherein, $0.90 \leq a \leq 1$ and $0.001 \leq b \leq 0.1$); $QO_2$, $QS_2$; $LiQS_2$; $V_2O_5$, $LiV_2O_5$; $LiTO_2$; $LiNiVO_4$; $Li_{(3-f)}J_2(PO_4)_3$ (wherein, $0 \leq f \leq 2$); $Li_{(3-f)}Fe_2(PO_4)_3$ (wherein, $0 \leq f \leq 2$); and $LiFePO_4$.

In the Formulas, A is Ni, Co, Mn, or a combination thereof; L is Al, Ni, Co, Mn, Cr, Fe, Mg, Sr, V, rare earth elements, or a combination thereof; D is O, F, S, P, or a combination thereof; E is Co, Mn, or a combination thereof; M is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

Examples of the positive active material may include $LiCoO_2$, $LiMn_xO_{2x}$ (x=1, 2), $LiNi_{1-x}Mn_xO_{2x}$ (0<x<1), $LiNi_{1-x-y}Co_xMn_yO_2$ (0≤x≤0.5, 0≤y≤0.5), $FePO_4$, etc.

The positive active material composition may include the same conducting agent, binder and solvent as those in the negative active material composition. In some cases, it is possible to form pores in the electrode plates by additionally adding a plasticizer to the positive active material composition and the negative active material composition. The positive active material, conducting agent, binder and solvent may be contained (e.g., included) in any suitable amount levels that they are generally utilized in a lithium battery.

The positive electrode current collector has a thickness of about 3 μm to about 500 μm. The materials for the positive electrode current collector are not particularly limited if these materials for the positive electrode current collector do not cause chemical changes in relevant batteries, but have high electrical conductivities. Examples of the positive electrode current collector may include: stainless steel; aluminum; nickel; titanium; calcined carbon; aluminum or stainless steel of which the surface is treated with carbon, nickel, titanium, silver, etc.; etc. Further, micro protrusions and depressions may be formed on the surface of the current collector such that binding power of the positive active material may be increased, and the current collector may be utilized in various suitable forms such as a film, a sheet, a foil, a net, a porous body, a foam, a nonwoven fabric, etc.

A positive electrode plate may be manufactured by directly coating the prepared positive active material composition on the positive electrode current collector, and drying the positive active material composition coated on the positive electrode current collector. In some embodiments, the positive electrode plate may be manufactured by casting the positive active material composition on a separate support, delaminating a film from the support, and laminating the obtained film on the positive electrode current collector.

Any suitable material may be utilized for the separator if these materials are ordinarily utilized in lithium batteries for the separator. For example, materials for the separator that are low in resistant to ion movements of an electrolyte and have excellent moisture-containing capabilities of an electrolytic solution are appropriate for the separator. Examples of the separator may include materials selected from glass fibers, polyester, Teflon, polyethylene, polypropylene, polytetrafluoroethylene (PTFE), and combinations thereof. The separator may be formed in the form of a nonwoven fabric or a fabric. The separator may have a pore diameter of about 0.01 μm to about 10 μm. In general, the separator may have a thickness of about 5 μm to about 300 μm.

A lithium salt-containing non-aqueous electrolyte includes (e.g., consists of) a non-aqueous electrolytic solution and a lithium salt. Examples of the non-aqueous electrolyte may include a non-aqueous electrolytic solution, a solid electrolyte, an inorganic solid electrolyte, etc.

Examples of the non-aqueous electrolytic solution may include aprotic organic solvents such as N-methyl-2-pyrrolidone, propylene carbonate, ethylene carbonate, butylene carbonate, dimethyl carbonate, diethyl carbonate, fluoroethylene carbonate, ethylene methylene carbonate, methyl propyl carbonate, ethyl propionate, methyl acetate, ethyl acetate, propyl acetate, dimethyl ester, γ-butyrolactone, 1,2-dimethoxy ethane, tetrahydrofuran, 2-methyl tetrahydrofuran, dimethyl sulfoxide, 1,3-dioxolane, formamide, dimethyl formamide, dioxolane, acetonitrile, nitromethane, methyl formate, triester phosphate, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc.

Examples of the organic solid electrolyte may include polyethylene derivatives, polyethylene oxide derivatives, polypropylene oxide derivatives, phosphate ester polymers, poly agitation lysine, polyester sulfide, polyvinyl alcohol, polyvinylidene fluoride, polymers including ionically dissociable groups, etc.

Examples of the inorganic solid electrolyte may include Li nitrides, Li halides, and Li sulfates, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_3PO_4$—$Li_2S$—$SiS_2$, etc.

Any suitable lithium salts can be utilized if the lithium salts are generally utilized in lithium batteries. Examples of the lithium salts, as materials that are well dissolved into the non-aqueous electrolyte, may include at least one of the materials among LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, 4-phenyllithium boric acid, etc.

The lithium batteries may be divided (e.g., categorized) into lithium ion batteries, lithium ion polymer batteries, and lithium polymer batteries depending on the separator and the electrolyte utilized. The lithium batteries may be divided (e.g., categorized) into cylindrical lithium batteries, rectangular lithium batteries, coin type (or kind) lithium batteries, pouch type (or kind) lithium batteries, etc., depending on the shape of the lithium batteries. The lithium batteries may be divided (e.g., categorized) into bulk lithium batteries and thin film lithium batteries depending on the size of the lithium batteries. Further, the lithium batteries may be also divided (e.g., categorized) into lithium primary batteries as well as lithium secondary batteries.

Because any suitable method of manufacturing batteries generally available in the art may be used, more detailed descriptions of the methods are not repeated here.

Figure 4:
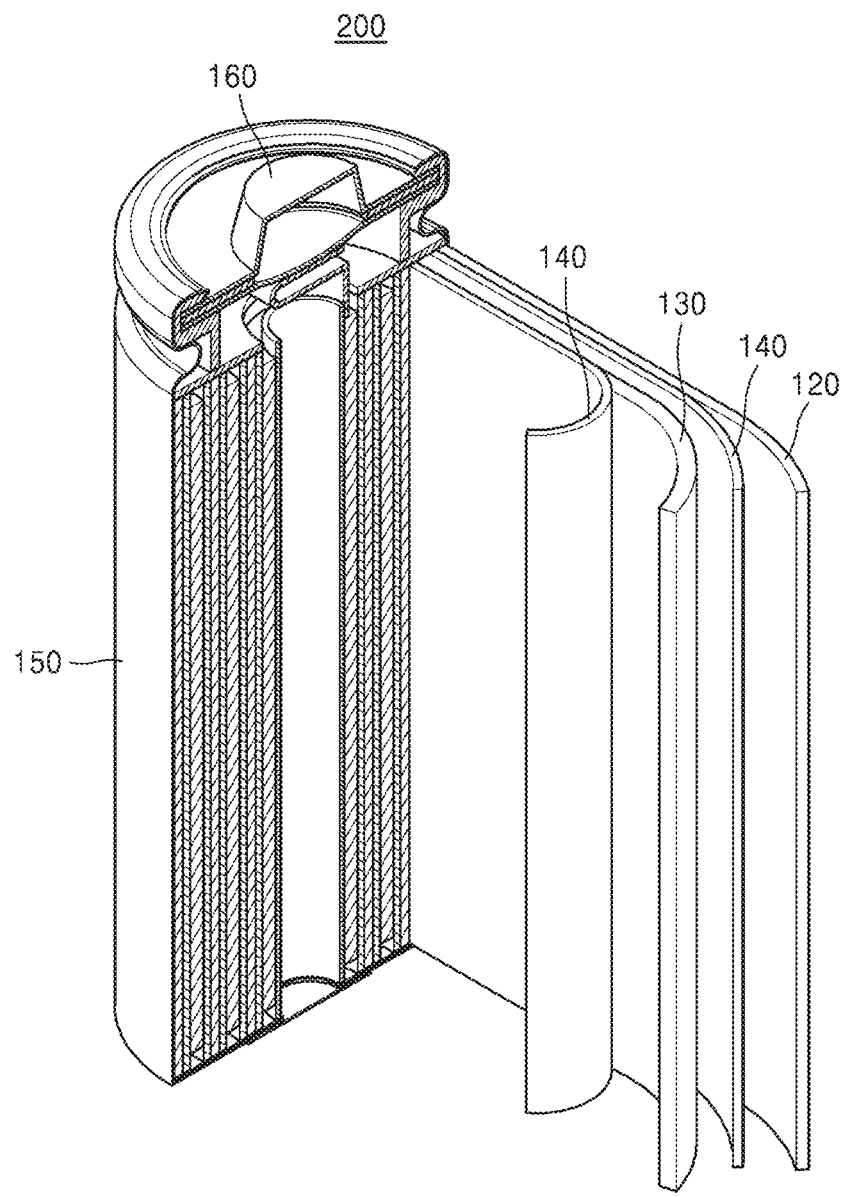
FIG. 4 is a schematic diagram showing the structure of a lithium battery according to one or more exemplary embodiments.

FIG. 4 schematically illustrates a representative structure of a lithium battery according to an embodiment of the present disclosure.

Referring to FIG. 4, the lithium battery 200 includes a positive electrode 130, a negative electrode 120, and a separator 140 disposed between the positive electrode 130 and the negative electrode 120. The positive electrode 130, the negative electrode 120, and the separator 140 are wound or folded and housed in a battery case 150. Subsequently, an electrolyte is injected into the battery case 150, and the battery case 150 is sealed by a sealing member 160 such that the lithium battery 200 may be completed. The battery case 150 may be formed in a cylindrical shape, a rectangular shape, a thin film shape, etc. The lithium battery may be a lithium ion battery.

The lithium secondary battery may be divided (e.g., categorized) into a winding type (or kind) lithium secondary battery and a stack type (or kind) lithium secondary battery according to the type (or kind) of the electrodes, and may be divided (e.g., categorized) into a cylindrical lithium secondary battery, a rectangular lithium secondary battery, a coin type (or kind) lithium secondary battery, and a pouch type (or kind) lithium secondary battery according to the shape and exterior materials.

The lithium batteries may be utilized not only as batteries utilized as power sources of small devices, but also as unit batteries in battery modules of medium to large sized devices including multiple batteries.

Examples of the medium to large sized devices may include: power tools; xEV including electric vehicles (EV), hybrid electric vehicles (HEV), and plug-in hybrid electric vehicles (PHEV); electric two wheeled vehicles including E-bikes and E-scooters; electric golf carts; electric trucks; electric commercial vehicles; power storage systems, etc., but the medium to large sized devices are not limited to the examples. Further, the lithium batteries may be utilized in all other applications in which high output power, high voltage, and high temperature driving are required.

Hereinafter, exemplary embodiments of the present disclosure are described more in detail through the following Examples and Comparative Examples. However, such embodiments are provided for illustrative purposes only, and the scope of the present invention should not be limited thereto in any manner. Further, it should be understood that the present disclosure is not limited to the above descriptions because other various modifications of the present disclosure may occur to persons having ordinary knowledge in the related art of the present disclosure.

(Preparation of Negative Active Material)

EXAMPLE 1

A Si core/TiN complex was prepared by primarily (e.g., first) heat-treating the $TiSi_2$ powder (produced by Kojundo Corporation) having an average particle diameter of about 0.2 μm for about 2 hours while increasing the temperature to about 1000° C. at a rate of about 5° C./min under a nitrogen ($N_2$) atmosphere. After this, a Si core/TiN/Si nanowire complex was prepared by secondly (e.g., subsequently) heat-treating the Si/TiN complex for about 5 hours, while increasing the temperature to about 1100° C. at a rate of about 5° C./min under a nitrogen ($N_2$) atmosphere through a continuous process such that a Si nanowire was directly grown on the Si core. The Si core had an average particle diameter of about 0.2 μm, the TiN had an average particle diameter of about 0.01 μm, and the Si nanowire had an average diameter of about 10 nm to about 50 nm, and an average length of about 3 μm. Further, the Si core/TiN/Si nanowire complex contained about 45% by weight of Si based on the total weight of the complex.

EXAMPLE 2

A Si core/TiN complex was prepared by primarily (e.g., first) heat-treating the $TiSi_2$ powder (produced by Kojundo Corporation) having an average particle diameter of about 0.2 μm for about 5 hours while increasing the temperature to about 1000° C. at a rate of about 5° C./min under a nitrogen ($N_2$) atmosphere. After this, a Si core/TiN/carbon nanowire complex was prepared by secondly (e.g., subsequently) heat-treating the Si/TiN complex for about 1 hour, while decreasing the temperature to about 900° C. under a methane ($CH_4$) gas atmosphere such that a carbon nanowire was grown on the Si core and/or TiN. The Si core had an average particle diameter of about 0.2 μm, the TiN had an average particle diameter of about 0.01 μm, and the carbon nanowire had an average diameter of about 10 nm to about 30 nm, and an average length of about 0.15 μm. Further, the Si core/TiN/carbon nanowire complex contained about 37% by weight of Si based on the total weight of the complex, and the Si core/TiN/carbon nanowire complex contained about 10% by weight of carbon based on the total weight of the complex.

EXAMPLE 3

A Si core/TiN/Si nanowire complex coated with carbon was prepared by heat-treating the mixture at about 500° C. for about 2 hours after mixing the Si core/TiN/Si nanowire complex prepared in Example 1 with a pitch (produced by CR-Tech Corporation) utilizing a stirrer. The carbon-coated Si core/TiN/Si nanowire complex contained about 38% by weight of Si based on the total weight of the complex and the carbon coating, and the carbon-coated Si core/TiN/Si nanowire complex contained about 20% by weight of carbon based on the total weight of the complex and the carbon coating.

EXAMPLE 4

A Si core/TiN/carbon nanowire complex coated with carbon was prepared by heat-treating the mixture at about 500° C. for about 2 hours after mixing the Si core/TiN/carbon nanowire complex prepared in Example 2 with a pitch (produced by CR-Tech Corporation) utilizing a stirrer. The carbon-coated Si core/TiN/carbon nanowire complex contained about 31% by weight of Si based on the total weight of the complex and the carbon coating, and the carbon-coated Si core/TiN/carbon nanowire complex contained about 30% by weight of carbon based on the total weight of the complex and the carbon coating.

EXAMPLE 5

A Si core/ZrN complex was prepared by primarily (e.g., first) heat-treating the $ZrSi_2$ powder (produced by Alfa Aesar Corporation) having an average particle diameter of about 0.2 μm for about 2 hours while increasing the temperature to about 1000° C. at a rate of about 5° C./min under a nitrogen ($N_2$) atmosphere. After this, a Si core/ZrN/Si nanowire complex was prepared by secondly (e.g., subsequently) heat-treating the Si/ZrN complex for about 5 hours, while increasing the temperature to about 1300° C. at a rate of about 5° C./min under a nitrogen ($N_2$) atmosphere through a continuous process (e.g., conducted immediately after the completion of the heat treating of the $ZrSi_2$ powder) such that a Si nanowire was directly grown on the Si core. The Si core had an average particle diameter of about 0.2 μm, the ZrN had an average particle diameter of about 0.01 μm, and the Si nanowire had an average diameter of about 10 nm to about 50 nm, and an average length of about 3 μm. Further, the Si core/ZrN/Si nanowire complex contained about 35% by weight of Si based on the total weight of the complex.

EXAMPLE 6

A Si core/ZrN complex was prepared by primarily (e.g., first) heat-treating the $ZrSi_2$ powder (produced by Alfa Aesar Corporation) having an average particle diameter of about 0.2 μm for about 5 hours while increasing the temperature to about 1000° C. at a rate of about 5° C./min under a nitrogen ($N_2$) atmosphere. After this, a Si core/ZrN/carbon nanowire complex was prepared by secondly (e.g., subsequently) heat-treating the Si/ZrN complex for about 1 hour, while decreasing the temperature of the Si/ZrN complex to about 900° C. under a methane ($CH_4$) gas atmosphere such that a carbon nanowire was grown on the Si core and/or ZrN. The Si core had an average particle diameter of about 0.2 µm, the ZrN had an average particle diameter of about 0.01 µm, and the carbon nanowire had an average diameter of about 10 nm to about 30 nm, and an average length of about 0.15 µm. Further, the Si core/ZrN/carbon nanowire complex contained about 27% by weight of Si based on the total weight of the complex, and the Si core/ZrN/carbon nanowire complex contained about 10% by weight of carbon based on the total weight of the complex.

COMPARATIVE EXAMPLE 1

A Si core/TiN complex was prepared by primarily (e.g., first) heat-treating the $TiSi_2$ powder (produced by Kojundo Corporation) having an average particle diameter of about 0.2 µm for about 5 hours while increasing the temperature to about 1000° C. at a rate of about 5° C./min under a nitrogen ($N_2$) atmosphere. The Si core had an average particle diameter of about 0.2 µm, and the TiN had an average particle diameter of about 0.01 µm.

COMPARATIVE EXAMPLE 2

A Si core/TiN complex coated with carbon was prepared by heat-treating the mixture at about 500° C. for about 2 hours after mixing the Si core/TiN complex prepared in Comparative Example 1 with a pitch (produced by CR-Tech Corporation) utilizing a stirrer. The carbon-coated Si core/TiN complex contained about 37% by weight of Si based on the total weight of the complex and the carbon coating, and the carbon-coated Si core/TiN complex contained about 20% by weight of carbon based on the total weight of the complex and the carbon coating.

COMPARATIVE EXAMPLE 3

A Si core/Si nanowire complex was prepared by growing a Si nanowire on Si (produced by Aldrich Corporation) having an average particle diameter of about 0.2 µm by utilizing a vapor-liquid-solid (VLS) growing method. The Si nanowire had an average diameter of about 10 nm to about 50 nm and an average length of about 3 µm.

COMPARATIVE EXAMPLE 4

A Si core/carbon nanowire complex was prepared by growing a carbon nanowire on Si (produced by Aldrich Corporation) having an average particle diameter of about 0.2 µm utilizing a vapor-liquid-solid (VLS) growing method. The carbon nanowire had an average diameter of about 10 nm to about 30 nm and an average length of about 0.15 µm, and the Si core/carbon nanowire contained about 10% by weight of carbon based on the total weight of the complex.

(Analyses of Negative Active Materials)

EVALUATION EXAMPLE 1: SURFACE ANALYSIS OF NEGATIVE ACTIVE MATERIAL OF EXAMPLE 1

Figure 5:
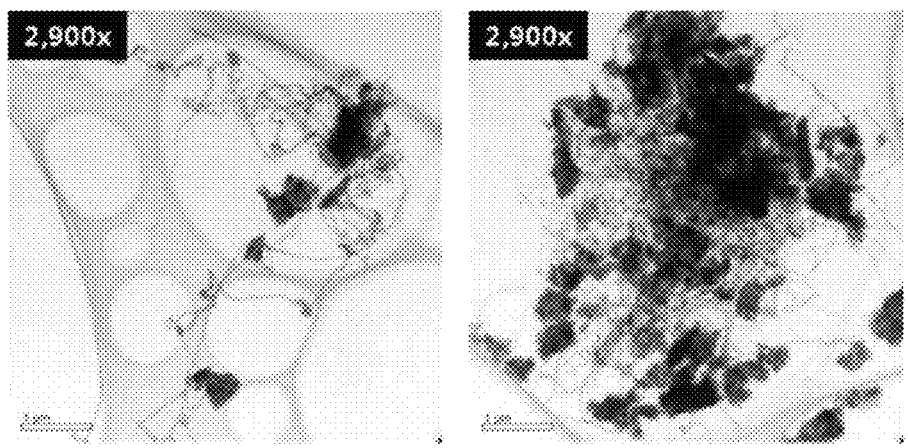
FIG. 5 shows scanning electron microscope (SEM) images (2,900 magnifications) of a negative active material prepared in Example 1.
Figure 6:
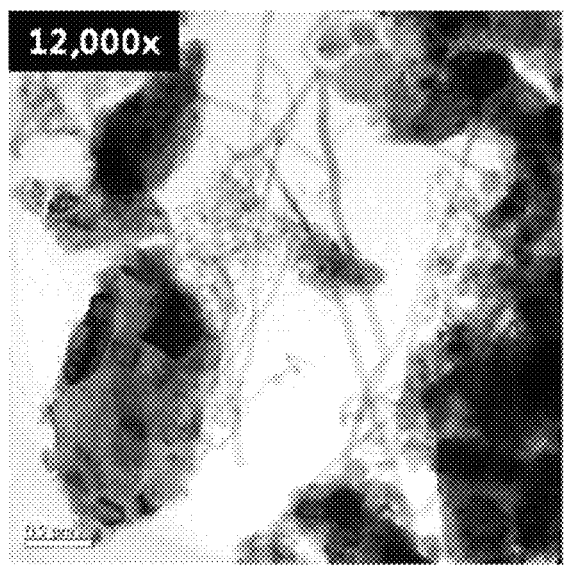
FIG. 6 shows an SEM image (12,000 magnifications) of a negative active material prepared in Example 1.

SEM images measured (e.g., taken) at about 2,900 magnifications with respect to the negative active material prepared in Example 1 are represented (shown) in FIG. 5, and SEM images measured (e.g., taken) at about 12,000 magnifications with respect to the negative active material prepared in Example 1 are represented (shown) in FIG. 6.

It could be confirmed from FIG. 5 and FIG. 6 that dark-colored island-type TiN was randomly formed on the surface of an oval-shaped Si core, and a thread-shaped Si nanowire was grown from Si.

Figure 7A:
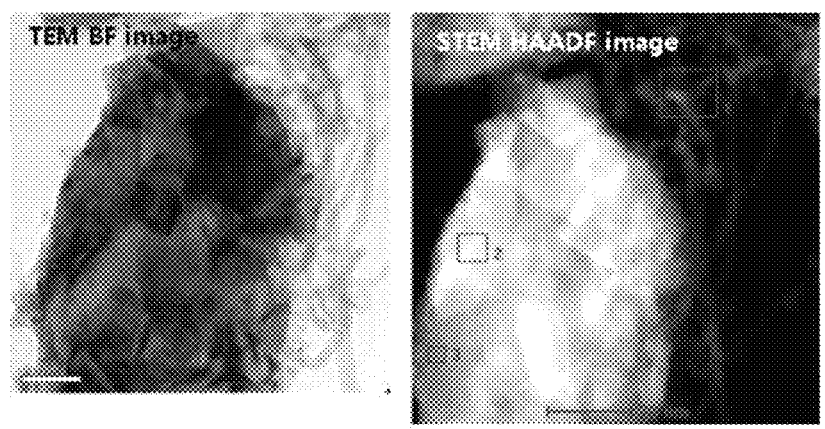
FIG. 7A shows a transmission electron microscope (TEM) image (left) and a high angle annular dark field-scanning transmission electron microscope (HAADF-STEM) image (right) of a negative active material prepared in Example 1.
Figure 7B:
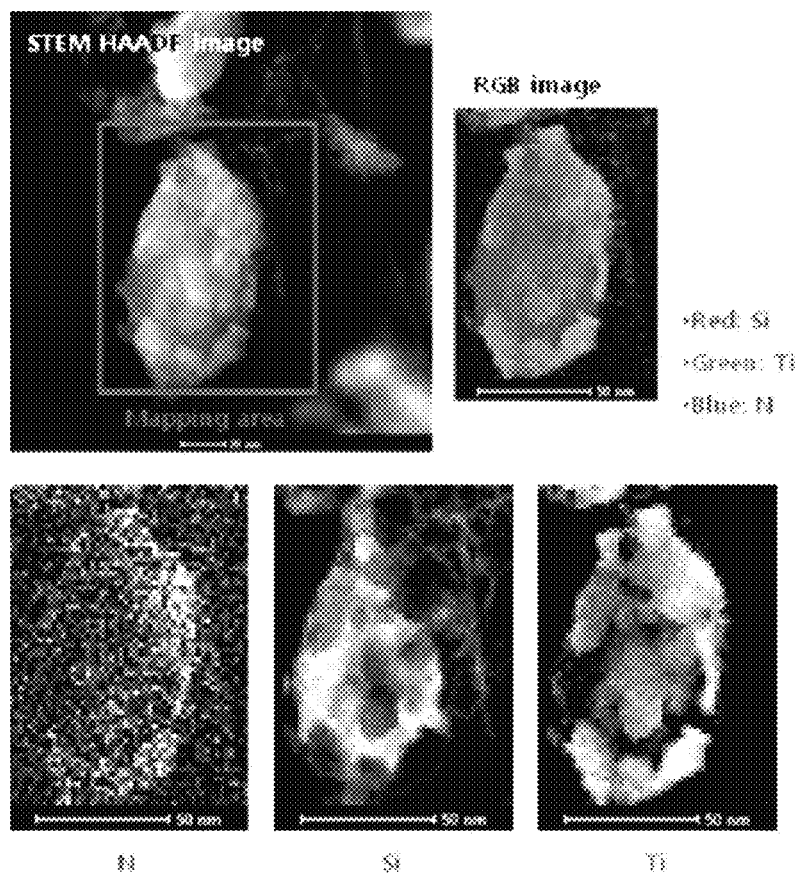
FIG. 7B shows HAADF-STEM Red Green Blue (RGB) images of a negative active material prepared in Example 1.

In order to further confirm this, TEM images and the analysis of HAADF-STEM images were obtained on a portion of the negative active material of Example 1 and the images are shown in FIG. 7A and FIG. 7B respectively. The left image of FIG. 7A is a TEM image, and the right image of FIG. 7A and images of FIG. 7B are HAADF-STEM images.

Figure 8:
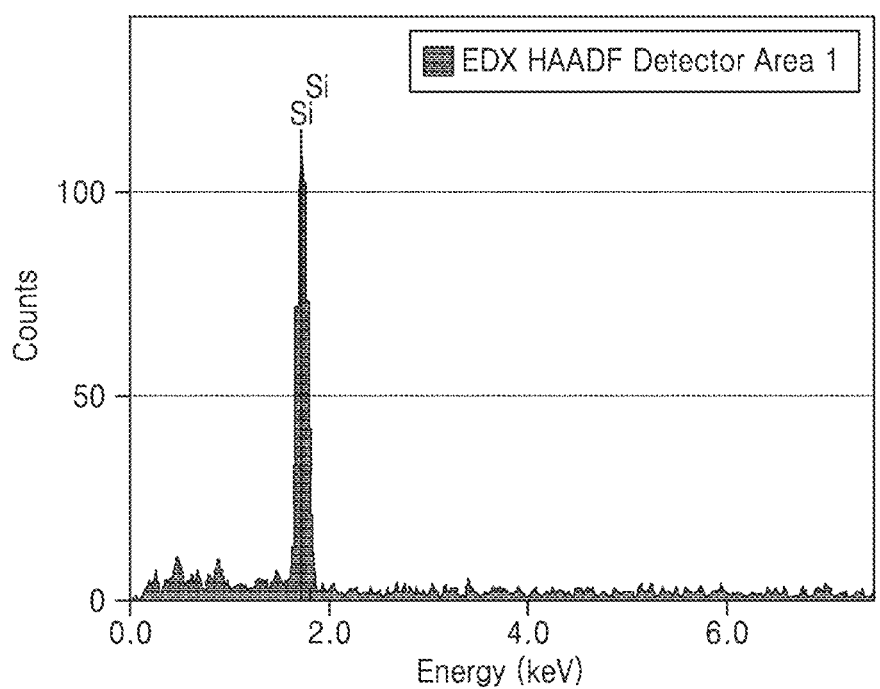
FIG. 8 shows an energy dispersive X-ray (EDX) analysis result of the first area in the HAADF-STEM image of FIG. 7A.
Figure 9:
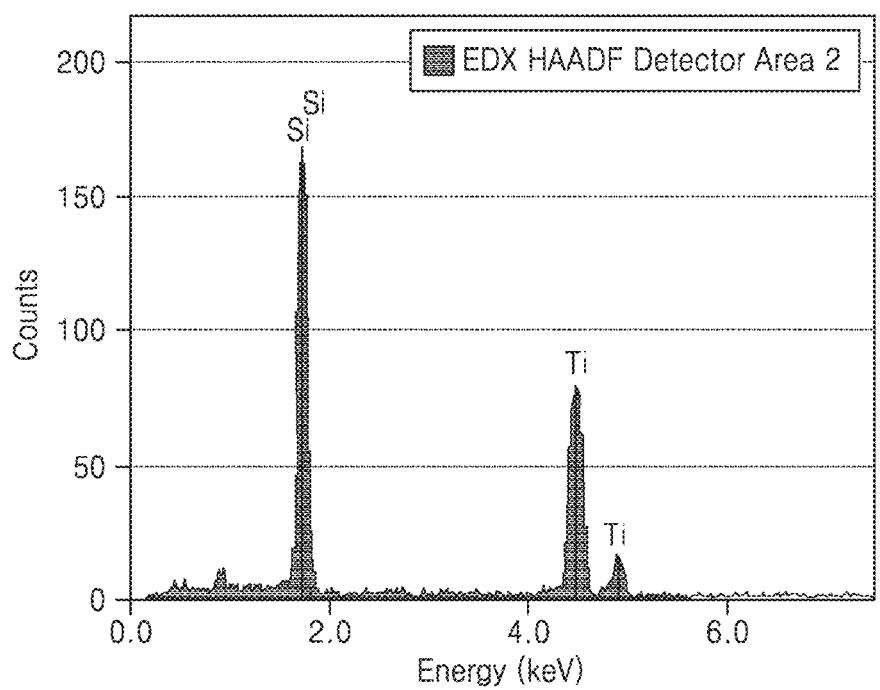
FIG. 9 shows an EDX analysis result of the second area in the HAADF-STEM image of FIG. 7A.
Figure 10:
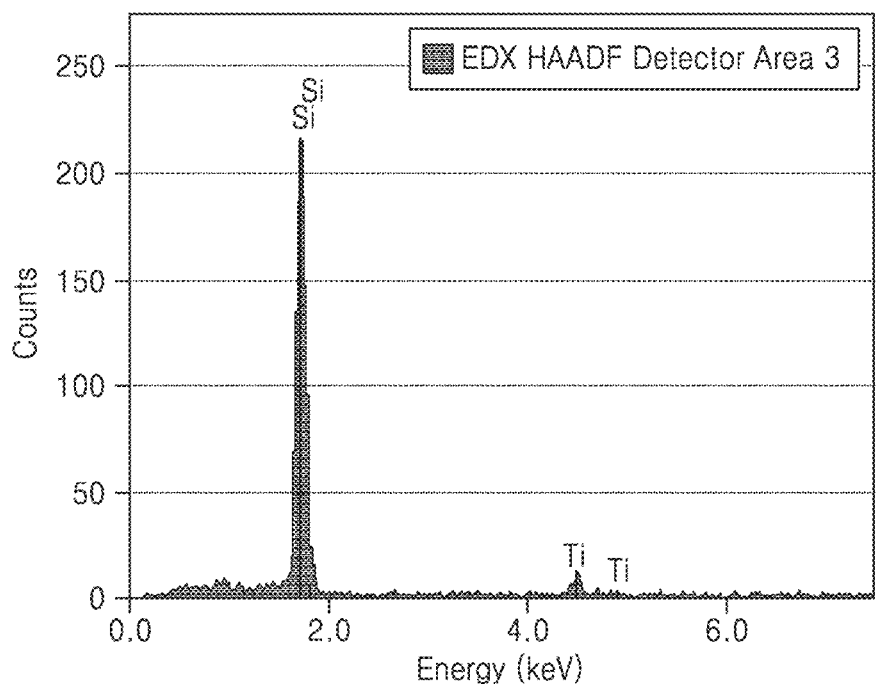
FIG. 10 shows an EDX analysis result of the third area in the HAADF-STEM image of FIG. 7A.

The analysis results are represented (shown) in FIG. 8 to FIG. 10 by performing the EDX analysis on a first area (a nanowire portion) represented by "1", a second area (a portion coated with some TiN) represented by "2", and a third area (a Si core portion) represented by "3" in the HAADF-STEM image of FIG. 7A in order to analyze specific components of the negative active material prepared in Example 1.

It can be confirmed (as shown in FIG. 8) that the nanowire is directly grown and formed on a Si core because a nanowire in the negative active material prepared in Example 1 is formed of Si only. Further, it can be confirmed (as shown in FIG. 9 and FIG. 10) that Ti was detected in some areas but Ti was hardly detected in other areas in the negative active material prepared in Example 1. Therefore, it can be confirmed that an island-type TiN was coated on the Si core.

Figure 11A:
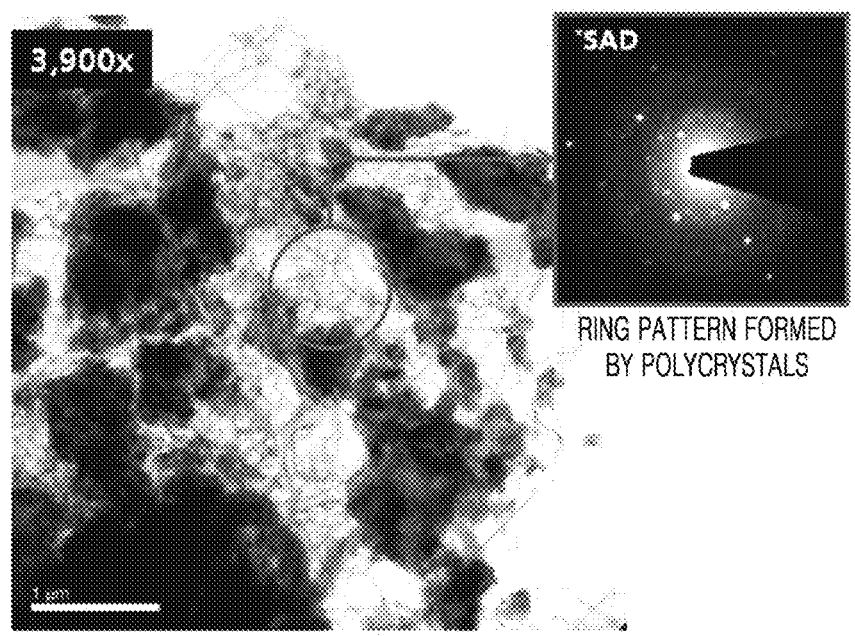
FIG. 11A shows an SEM image (3,900 magnifications) of a negative active material prepared in Example 1, and a selective area diffraction (SAD) analysis result for a portion of the SEM image.
Figure 11B:
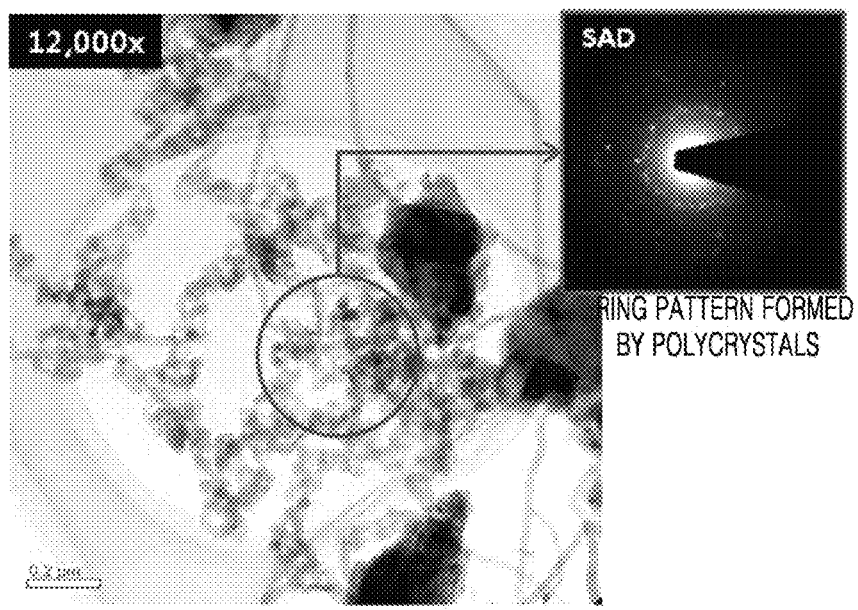
FIG. 11B shows an SEM image (12,000 magnifications) of a negative active material prepared in Example 1, and a SAD analysis result for a portion of the SEM image.

Further, in order to confirm a crystal phase of a Si nanowire, the SAD analysis was performed on some areas in an SEM image (in which the negative active material prepared in Example 1 was measured at about 3,900 magnifications) and the analysis result is shown in FIG. 11A. Further, the SAD analysis was performed on some areas in an SEM image (in which the negative active material prepared in Example 1 was measured at about 12,000 magnifications) and the analysis result is shown in FIG. 11B. Because crystal structures shown by the SAD analyses of FIG. 11A and FIG. 11B were due to polycrystalline phases of Si, the formation of Si nanowires having the polycrystalline phases can be confirmed.

EVALUATION EXAMPLE 2: SURFACE ANALYSIS OF NEGATIVE ACTIVE MATERIAL OF EXAMPLE 2

Figure 12A:
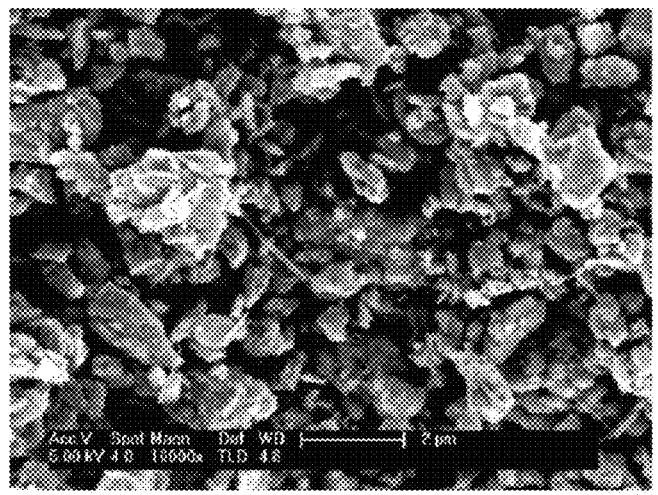
FIG. 12A shows SEM images (the upper side image has 10,000 magnifications, and the lower side image has 20,000 magnifications) of a negative active material prepared in Example 2.
Figure 12A:
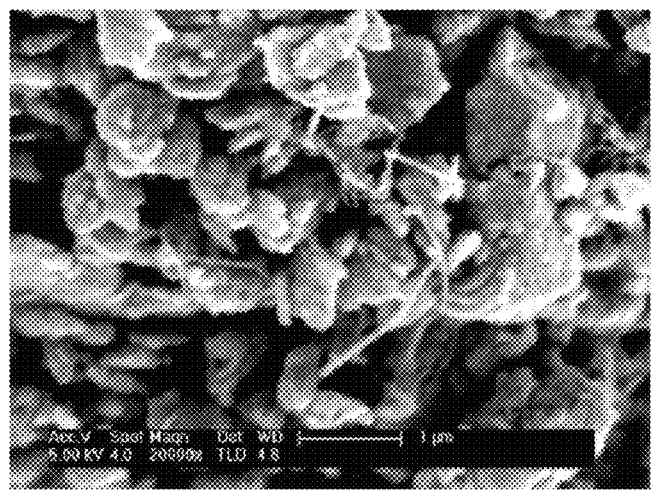
Figure 12B:
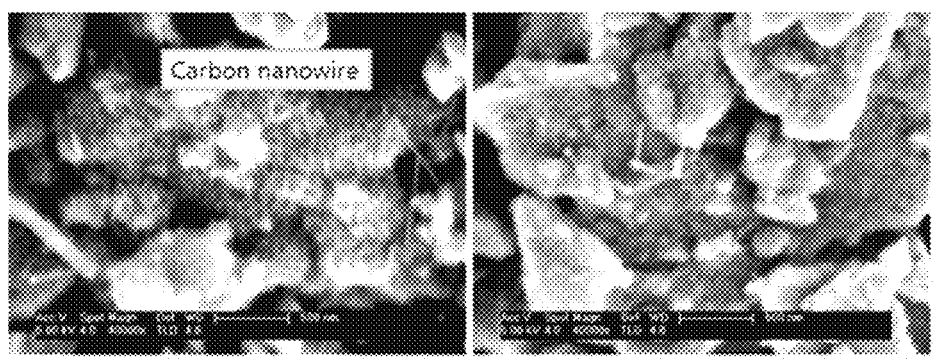
FIG. 12B shows SEM images (40,000 magnifications) of a negative active material prepared in Example 2.

SEM images in which the negative active material prepared in Example 2 was measured at about 10,000 magnifications and at about 20,000 magnifications are respectively shown at the upper side and the lower side of FIG. 12A, and SEM images in which the negative active material prepared in Example 2 was measured at about 40,000 magnifications are represented (shown) in FIG. 12B.

As shown in FIG. 12A and FIG. 12B, it can be confirmed that carbon nanowires are formed on a Si core/TIN complex.

EVALUATION EXAMPLE 3: SURFACE ANALYSIS OF NEGATIVE ACTIVE MATERIAL OF COMPARATIVE EXAMPLE 1

Figure 13:
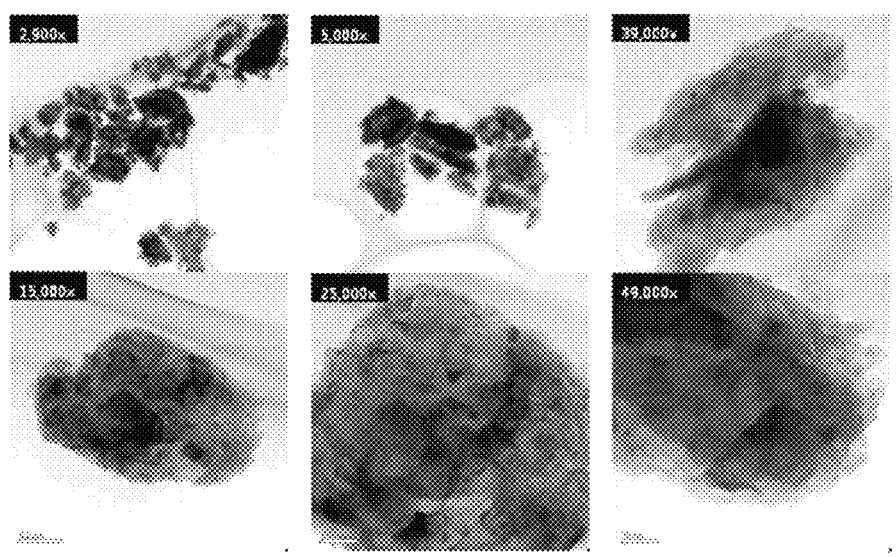
FIG. 13 shows SEM images of a negative active material prepared in Comparative Example 1.

SEM images in which the negative active material prepared in Comparative Example 1 was measured at 6 different magnifications respectively are represented (shown) in FIG. 13.

As shown in FIG. 13, it can be seen that nanowires are not formed on a Si core/TiN complex in case of the negative active material prepared in Comparative Example 1, different from the negative active materials prepared in Examples 1 and 2. Accordingly, it can be confirmed that the nanowires are not grown when a TiSi$_2$ powder is heat-treated at about 1000° C. or lower.

EVALUATION EXAMPLE 4: SURFACE ANALYSES OF NEGATIVE ACTIVE MATERIALS OF EXAMPLES 1 AND 2, AND COMPARATIVE EXAMPLE 1 (CHECKING WHETHER TiN IS FORMED OR NOT)

Figure 14:
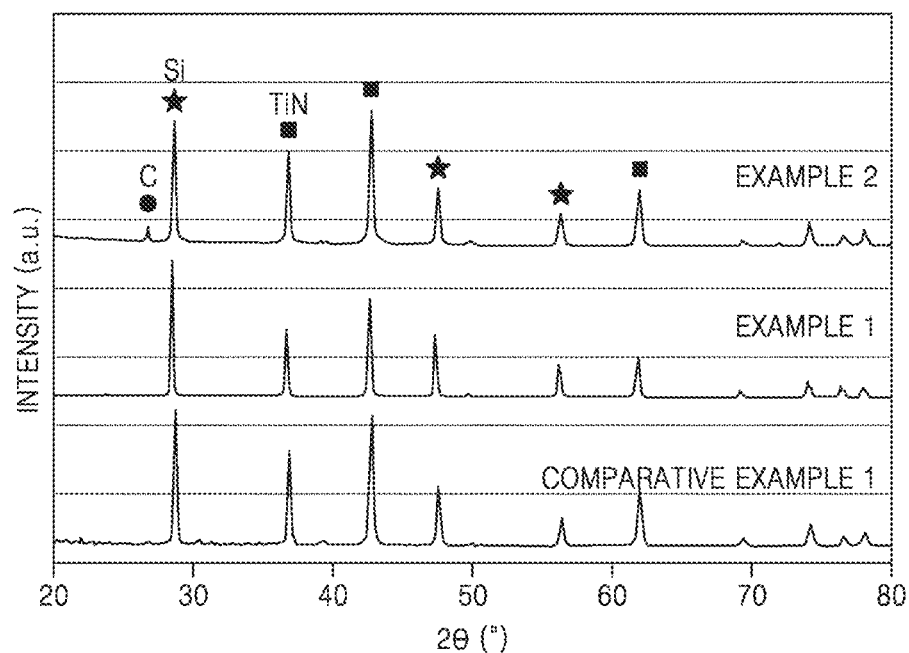
FIG. 14 shows X-ray diffraction (XRD) spectrum results of negative active materials prepared in Examples 1 and 2, and Comparative Example 1.

XRD analyses utilizing Cu—Kα were performed to check if a phase separation is occurred from a TiSi$_2$ powder to Si and TiN with respect to the negative active materials prepared in Examples 1 and 2, and Comparative Example 1, and the analysis results are represented (shown) in FIG. 14.

As shown in FIG. 14, it can be confirmed from the detection of Si and TiN that the phase separation occurred in all of the negative active materials prepared in Examples 1 and 2, and Comparative Example 1. Further, carbon was additionally detected due to a carbon nanowire in case of the negative active material prepared in Example 2.

EVALUATION EXAMPLE 5: MEASURING ELECTRICAL CONDUCTIVITIES OF NEGATIVE ACTIVE MATERIALS

Electrical conductivity according to the packing density of the negative active materials prepared in Examples 1 and 2, and Comparative Example 1 were measured utilizing an electrical conductivity meter MCP-PD51 produced by Mitsubishi Chemical Corporation.

After charging (e.g., loading) respective holders (e.g., sample holders) with the negative active materials prepared in Examples 1 and 2, and Comparative Example 1 in a set or predetermined amount, pellets were prepared by applying a pressure to the holders charged with the negative active materials. Each of the pellets has a mass of about 2.040 g. A distance between electrodes of the electrical conductivity meter was about 3 mm, the electrodes had a radius of about 0.7 mm, and the pellets had a radius of about 10 mm. Resistance values (R) of patterns (e.g., the pellets) per respective pressure values were calculated utilizing a Four-point probe. Specific resistivities and electrical conductivities were calculated utilizing the resistance values obtained above and correction factors considering the thicknesses and shapes of the patterns (e.g., the pellets) such as appearance, etc. At this time, the specific resistivities and electrical conductivities were respectively obtained by the following Mathematical Expressions 1 and 2:

Specific resistance calculation formula: ρ=G×R,
G=3.575×t            Mathematical Expression 1

(ρ: specific resistivity, R: resistance value, G: shape correction factor, t: pattern thickness)

$$\sigma = \frac{1}{\rho}$$            Mathematical Expression 2

(σ: electrical conductivity, ρ: specific resistivity)

Results of measuring the electrical conductivities of the pellets while increasing the mixing density of the pellets are represented (shown) in the following Table 1 and FIG. 15.

TABLE 1

| | Negative active material | Electrical conductivity (S/cm) |
|---|---|---|
| Example 1 | Si core/TiN/Si nanowire complex | 2.365E−02 |
| Example 2 | Si core/TiN/carbon nanowire complex | 1.438E+00 |
| Comparative Example 1 | Si core/TiN complex | 4.714E−04 |

Figure 15:
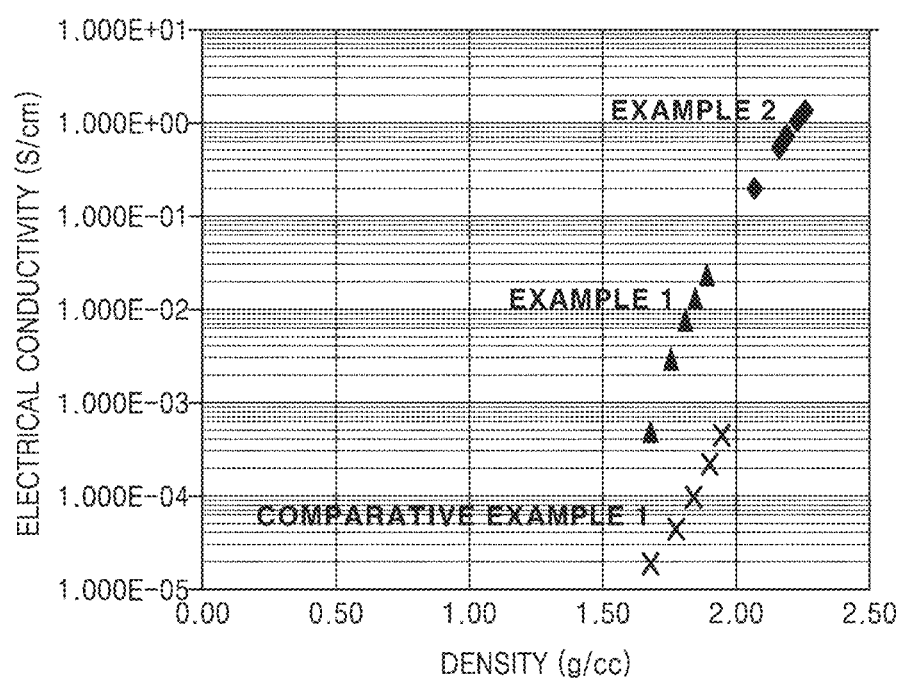
FIG. 15 is a graph showing the electrical conductivity according to the density of negative active materials prepared in Examples 1 and 2, and Comparative Example 1.

As shown in Table 1 and FIG. 15, it can be seen that Si core/TiN complexes in which nanowires were formed (Examples 1 and 2) had higher electrical conductivities than electrical conductivity of a Si core/TiN complex in which a nanowire was not formed (Comparative Example 1). The Si core/TiN/carbon nanowire complex had the highest electrical conductivity due to the conductivity of carbon. An increase in electrical conductivity has functionality that is capable of improving the charge/discharge efficiencies and lifetime characteristics.

(Manufacturing of Lithium Secondary Batteries)

EXAMPLE 7

(Preparation of a Negative Electrode)

A negative active material composition was prepared by mixing the negative active material prepared in Example 1, polyimide (PI) as a binder and a carbon conducting agent (Denka Black) as a conducting agent at a weight ratio of about 80:10:10, and N-methyl pyrrolidone as a solvent for adjusting the viscosity of the negative active material composition was added to the mixture such that a resulting material contained about 60% by weight of solids.

The negative active material composition was coated to a thickness of about 89 μm on a copper current collector having a thickness of about 8 μm utilizing an ordinary (e.g., a suitable) coating method. A negative electrode to be applied to cells of 18650 battery standards was prepared by drying the composition-coated current collector at room temperature, drying the composition-coated current collector again at about 120° C., and rolling and punching the dried composition-coated current collector.

(Preparation of a Positive Electrode)

A positive active material composition was prepared by mixing LiNi$_{0.8}$Co$_{0.1}$Al$_{0.1}$O$_2$ as a positive active material, polyvinylidene fluoride (PVDF) as a binder and a carbon conducting agent (Denka Black) as a conducting agent at a weight ratio of about 90:5:5, and N-methyl pyrrolidone as a solvent for adjusting the viscosity of the positive active material composition was added to the mixture such that a resulting material contained about 60% by weight of solids.

The positive active material composition was coated to a thickness of about 86 μm on an aluminum current collector having a thickness of about 13.5 μm utilizing an ordinary (e.g., a suitable) coating method. A positive electrode to be applied to cells of 18650 battery standards was prepared by drying the composition-coated current collector at room temperature, drying the composition-coated current collector again at about 120° C., and rolling and punching the dried composition-coated current collector.

(Manufacturing of a Lithium Secondary Battery—A Full Cell)

A cell of 18650 battery standards was manufactured by inserting the prepared negative electrode and positive electrode into a battery case, interposing a polypropylene separator with a thickness of about 14 μm between the positive electrode and negative electrode in the battery case, and injecting an electrolyte into the battery case. The electrolyte was an electrolyte in which $LiPF_6$ was dissolved into a mixed solvent obtained by mixing ethylene carbonate (EC), diethyl carbonate (DEC) and fluoroethylene carbonate (FEC) at a volume ratio of about 5:75:20 such that the dissolved solution had a concentration of about 1.5 M.

EXAMPLES 8 to 12

Lithium secondary batteries were manufactured by substantially the same method as in Example 1 except that the negative active materials prepared in Examples 2 to 6 were respectively utilized instead of the negative active material prepared in Example 1.

COMPARATIVE EXAMPLES 5 to 8

Lithium secondary batteries were manufactured by substantially the same method as in Example 1 except that the negative active materials prepared in Comparative Examples 1 to 4 were respectively utilized instead of the negative active material prepared in Example 1.

EVALUATION EXAMPLES 6: EVALUATION OF VOLUME EXPANSION RATIOS OF NEGATIVE ELECTRODES

After performing a charging process on the negative electrodes of the cells manufactured in Examples 1 and 2, and Comparative Example 1 to about 0.05C, the cells were dissembled, thicknesses of the negative electrode plates before and after the charging process were compared, and the volume expansion ratios of the negative electrodes were calculated, some of the measurement results are illustrated (shown) in the following Table 2.

TABLE 2

| | Negative active material | Volume expansion ratio (%) |
|---|---|---|
| Example 1 | Si core/TiN/Si nanowire complex | 29.7 |
| Example 2 | Si core/TiN/carbon nanowire complex | 33.0 |
| Comparative Example 1 | Si core/TiN complex | 37.4 |

As shown in Table 2, it can be seen that the Si core/TiN complex has a lowered volume expansion ratio by attaching a nanowire to the Si core/TiN complex. This is so because the nanowire attached to the Si core/TiN complex plays a role of relieving the expansion of a Si core. Further, the negative electrode including the Si core/TiN/Si nanowire complex prepared in Example 1 had the lowest volume expansion ratio because volume expansion due to a Si core was considered to be dispersed (e.g., suppressed) by a Si nanowire. This volume expansion ratio reduction may contribute to improvements in charge/discharge efficiencies and lifetime characteristics.

EVALUATION EXAMPLE 7: EVALUATING CHARGE/DISCHARGE EFFICIENCIES OF LITHIUM BATTERIES

Lithium secondary batteries manufactured in Examples 7 and 8, and Comparative Example 5 were charged to a current of about 0.1C rate at about 25° C. until a voltage reached about 0.1 V (vs. Li), and then the charged lithium secondary batteries were discharged to a current of about 0.1C rate until the voltage reached about 1.5 V (vs. Li).

Figure 16:
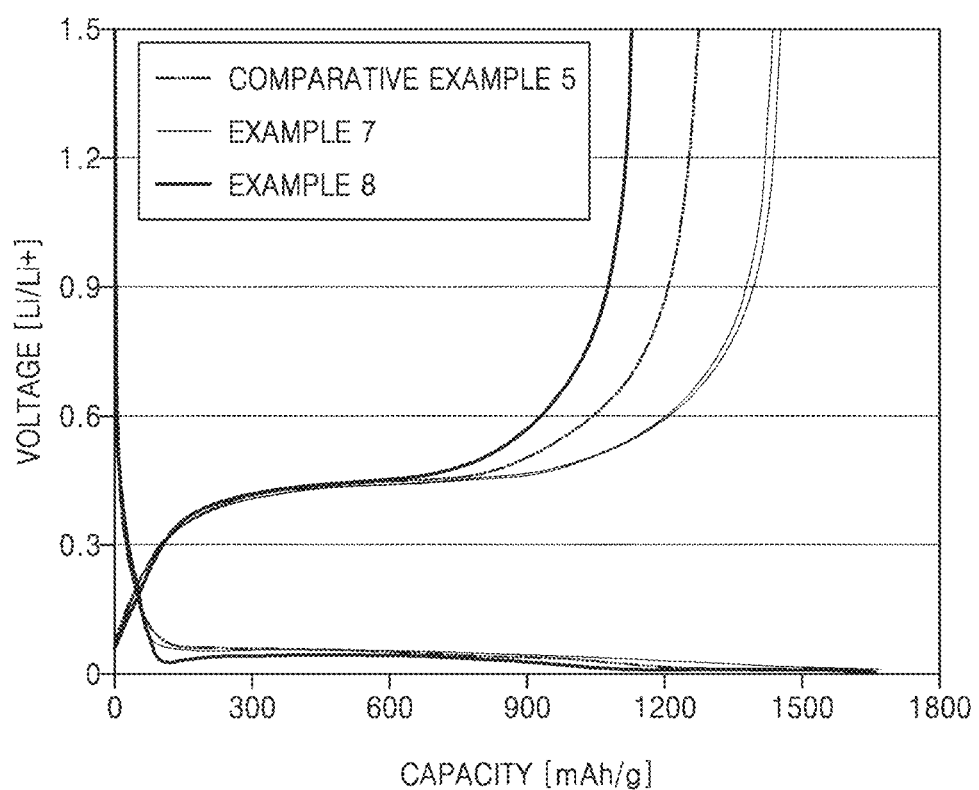
FIG. 16 shows the charge and discharge curves of lithium secondary batteries manufactured in Examples 7 and 8, and Comparative Example 5.

Charge/discharge curves of the batteries are represented (shown) in FIG. 16. Initial charge capacities and initial discharge capacities of the respective batteries were obtained from FIG. 16, and initial charge/discharge efficiencies (ICE) were calculated through the following Mathematical Expression 3. The initial charge/discharge capacities and ICE are listed in Table 3:

Initial charge/discharge efficiencies[%]=[initial discharge capacity/initial charge capacity]×100   Mathematical Expression 3

TABLE 3

| | Negative active material | Initial charge capacity (mAh/g) | Initial discharge capacity (mAh/g) | ICE (%) |
|---|---|---|---|---|
| Example 7 | Si core/TiN/Si nanowire complex | 1651.5 | 1427.9 | 86.5 |
| Example 8 | Si core/TiN/carbon nanowire complex | 1302.4 | 1175.2 | 90.2 |
| Comparative Example 5 | Si core/TiN complex | 1490.7 | 1272.9 | 85.4 |

As shown in Table 3, it can be seen that ICEs are improved by attaching a nanowire to the Si core/TiN complex. Further, initial charge/discharge capacities could also be increased by growing a Si nanowire from the Si core/TiN complex.

EVALUATION EXAMPLE 8: EVALUATING RATE-CHARACTERISTICS AND ROOM TEMPERATURE LIFETIME CHARACTERISTICS OF LITHIUM BATTERIES

The lithium secondary batteries manufactured in Examples 7 to 12 and Comparative Examples 5 to 8 were charged to a current of about 0.3C rate at about 25° C. until a charging cutoff voltage reached about 4.2 V in a constant current (CC) mode, and then the charged lithium secondary batteries were charged until a current reached about 0.05C rate while maintaining the voltage of about 4.2 V in a constant voltage (CV) mode.

Subsequently, the lithium secondary batteries passing through the constant current charging process and the constant voltage charging process were discharged to a current of about 0.5C rate to about 2C rate until a discharging cutoff voltage reached about 2.5 V in the CC mode, and discharge ratios were measured at 0.5C, 1C and 2C utilizing discharge capacities at about 0.3C as a reference capacity. The measured discharge ratios are represented (shown) in Table 4, where the discharge ratios are defined by the following Mathematical Expression 4:

Discharge ratio compared to 0.3C[%]=[discharge capacity at each C/discharge capacity at 0.3C]×100   Mathematical Expression 4

Figure 17:
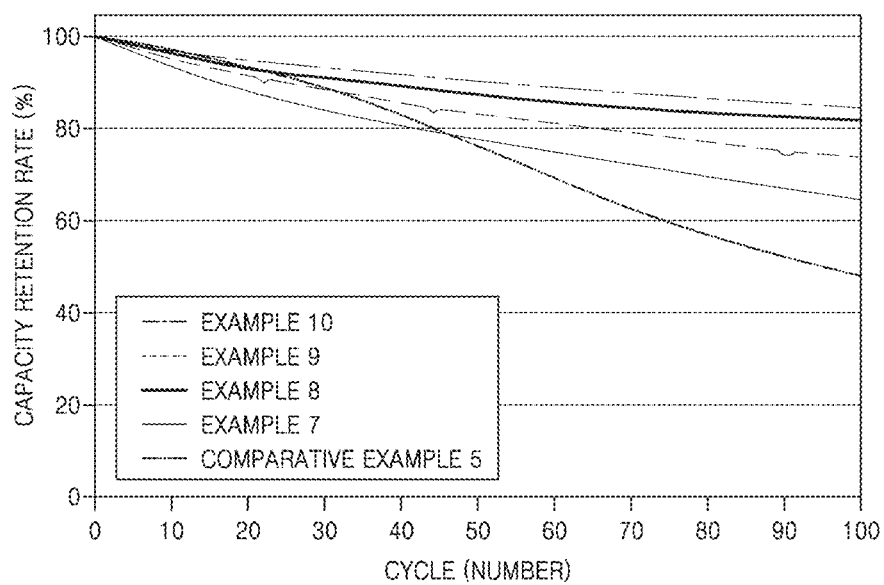
FIG. 17 is a graph showing the capacity retention rate versus cycle number of lithium secondary batteries manufactured in Examples 7 to 10, and Comparative Example 5.

The charged lithium batteries were discharged to a current of about 1.0C rate until a discharging cutoff voltage reached about 2.5 V in the CC mode by performing separate tests. Subsequently, capacity retention rates (CRRs) of the lithium batteries were measured by repeating about 100 charging and discharging cycles in the same current and voltage ranges. Measurement results are represented (shown) in FIG. 17 and Table 4, wherein the CRRs are defined by the following Mathematical Expression 5:

CRR[%]=[discharge capacity at each cycle/discharge capacity at the first cycle]×100  Mathematical Expression 5

TABLE 4

| Negative active material | | Discharge ratio (%) compared to 0.3 C | | | CRR (at 100$^{th}$ cycle) (%) |
|---|---|---|---|---|---|
| | | 0.5 C | 1 C | 2 C | |
| Example 7 | Si core/TiN/Si nanowire complex | 97.1 | 95.4 | 82.5 | 64.7 |
| Example 8 | Si core/TiN/carbon nanowire complex | 96.8 | 94.6 | 91.9 | 81.6 |
| Example 9 | Si core/TiN/Si nanowire complex with a carbon coating layer | 97.7 | 96.1 | 90.6 | 73.7 |
| Example 10 | Si core/TiN/carbon nanowire complex with a carbon coating layer | 96.5 | 94.1 | 90.5 | 84.5 |
| Example 11 | Si core/ZrN/Si nanowire complex | 92.1 | 89.6 | 80.3 | 61.4 |
| Example 12 | Si core/ZrN/carbon nanowire complex | 91.2 | 86.7 | 81.6 | 68.6 |
| Comparative Example 5 | Si core/TiN complex | 96.7 | 94.0 | 71.9 | 47.8 |
| Comparative Example 6 | Si core/TiN complex with a carbon coating layer | 97.2 | 94.3 | 75.6 | 53.9 |
| Comparative Example 7 | Si core/Si nanowire complex | 86.3 | 75.3 | 64.2 | 37.8 |
| Comparative Example 8 | Si core/carbon nanowire complex | 91.3 | 85.9 | 82.4 | 53.4 |

As shown in Table 4, it can be seen that batteries including Si core/TiN/nanowire complexes as a negative active material (Examples 7 and 8) have substantially improved rate-characteristics and lifetime characteristics compared to a battery including, as the negative active material, a Si core/TiN complex without having a nanowire (Comparative Example 5) and a battery including, as the negative active material, a Si core/TiN complex having a carbon coating layer without having a nanowire (Comparative Example 6). Although the present disclosure is not bound to any specific mechanism or theories, it is believed that the rate-characteristics and lifetime characteristics are substantially improved because electrical conductivity of a negative electrode including the negative active material is improved, and volume expansion of the negative electrode during charging and discharging is suppressed if the negative active material includes a Si core/TiN/nanowire complex.

Further, it can be seen that the batteries including Si core/TiN/nanowire complexes as the negative active material (Examples 7 and 8) also have substantially improved rate-characteristics and lifetime characteristics compared to batteries including, as the negative active material, Si core/nanowire complexes without having TiN (Comparative Examples 7 and 8). This is considered to be due to effects of improvement of electrical conductivities and the suppression of side reactions of TiN with the electrolytic solutions.

Moreover, it can be seen that batteries including Si core/TiN/nanowire complexes having a carbon coating layer as the negative active material (Examples 9 and 10) have further improved lifetime characteristics compared to batteries including, as the negative active material, Si core/TiN/nanowire complexes without having a carbon coating layer (Examples 7 and 8). This is so because the carbon coating layer plays a role of a protection layer of the complexes, and side reactions with electrolytic solutions are suppressed such that structural changes of the negative active material may be suppressed even during repeated charging and discharging.

Further, it can be seen that batteries including as the negative active material the Si core/ZrN/nanowire complexes (Examples 11 and 12) also have improved lifetime characteristics similarly to the batteries including as the negative active material the Si core/TiN/nanowire complexes (Examples 7 and 8).

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims, and equivalents thereof.

What is claimed is:

1. A negative active material for a lithium battery comprising:
   a complex comprising:
      a silicon-based core;
      particles of metal nitride randomly disposed on a surface of the silicon-based core as discrete islands, at least a portion of the surface of the silicon-based core being free of the particles of metal nitride; and
      nanostructures disposed on at least one of-the silicon-based core or the metal nitride.

2. The negative active material for the lithium battery of claim 1, wherein the silicon-based core comprises Si, $SiO_x$, a Si—Z alloy, or a combination thereof, wherein $0<x\leq2$, Z is an alkali metal, an alkali earth metal, a Group 13 element, a Group 14 element excluding Si, a Group 15 element, a Group 16 element, a transition metal, a rare earth element, or a combination thereof.

3. The negative active material for the lithium battery of claim 1, wherein the metal nitride comprises at least one metal selected from titanium (Ti), silicon (Si), zirconium (Zr), molybdenum (Mo), chromium (Cr), hafnium (Hf), vanadium (V), niobium (Nb), and tantalum (Ta).

4. The negative active material for the lithium battery of claim 1, wherein the metal nitride is selected from TiN, SiN, $Si_3N_4$, ZrN, $Mo_2N$, CrN, $Cr_2N$, HfN, VN, NbN, TaN, and a combination thereof.

5. The negative active material for the lithium battery of claim 1, wherein the nanostructures are in a shape of nanowire, nanofiber, nanorod, nanohair, nanofilament, and/or nanopillar.

6. The negative active material for the lithium battery of claim 1, wherein the nanostructures comprise silicon-based nanostructures or carbon-based nanostructures.

7. The negative active material for the lithium battery of claim 6, wherein the silicon-based nanostructures are directly grown on the silicon-based core.

8. The negative active material for the lithium battery of claim 1, further comprising a carbon-based coating layer on the complex.

9. The negative active material for the lithium battery of claim 1, wherein the silicon-based core and the metal nitride are formed by separating one compound into two phases by phase inversion.

10. A lithium battery comprising the negative active material according to claim 1.

* * * * *